(12) United States Patent
Racine et al.

(10) Patent No.: US 7,194,695 B1
(45) Date of Patent: Mar. 20, 2007

(54) LOGISTICS MANAGEMENT SYSTEM PRESENTING USER INTERFACE FOR PERFORMING MULTIPLE FREIGHT MANAGEMENT TASKS

(75) Inventors: Sandra J. Racine, Muskego, WI (US); Todd M. Rasmus, Apple Valley, MN (US); Scott A. Jungers, Eagan, MN (US); Joann E. Jancik, Victoria, MN (US)

(73) Assignee: Unisys Corporation, Blue Bell, PA (US)

( * ) Notice: Subject to any disclaimer, the term of this patent is extended or adjusted under 35 U.S.C. 154(b) by 779 days.

(21) Appl. No.: 10/403,588

(22) Filed: Mar. 31, 2003

(51) Int. Cl.
*G06F 3/00* (2006.01)
*G06F 9/00* (2006.01)
*G06F 17/00* (2006.01)

(52) U.S. Cl. .................. 715/780; 715/763; 715/764; 715/810; 707/104.1

(58) Field of Classification Search ............. 715/762, 715/763, 764, 780, 810; 707/104.1
See application file for complete search history.

(56) References Cited

U.S. PATENT DOCUMENTS 6,557,007 B1 * 4/2003 Pekowski et al. ......... 707/104.1
2002/0019759 A1 * 2/2002 Arunapuram et al. ........... 705/7
2002/0032612 A1 * 3/2002 Williams et al. .............. 705/26
2002/0188530 A1 * 12/2002 Wojcik et al. ................ 705/28
2003/0069738 A1 * 4/2003 Casey et al. ................... 705/1
2004/0054570 A1 * 3/2004 Streetman ...................... 705/8
2005/0021346 A1 * 1/2005 Nadan et al. ................... 705/1

* cited by examiner

*Primary Examiner*—Raymond J. Bayerl
*Assistant Examiner*—Anita Datta Chaudhuri
(74) *Attorney, Agent, or Firm*—Charles A. Johnson; Mark T. Starr; Shumaker & Sieffert

(57) ABSTRACT

A logistics management system is described that includes a host computer that performs logistics management tasks for shipment items, and a user interface module that presents a user interface for the host computer. The user interface module presents a user interface to include an item selection region to receive shipment criteria, one or more activity regions to display a set of shipment items that match the shipment criteria, and an action input region to receive action input specifying one or more logistics management tasks. The host computing system automatically performs the specified logistics management task on a plurality of the items in response to the action input received from a user. In this manner, an action may be performed on multiple items related to an overall logistics management task with limited user input required.

19 Claims, 20 Drawing Sheets

LOGISTICS MANAGEMENT SYSTEM PRESENTING USER INTERFACE FOR PERFORMING MULTIPLE FREIGHT MANAGEMENT TASKS

CROSS-REFERENCE TO RELATED APPLICATIONS

This application is related to co-pending U.S. patent application Ser. No. 10/403,465, entitled "Logistics Management System Having Dynamically Expandable User Interface Input Areas," U.S. patent application Ser. No. 10/403,427, entitled "Logistics Management System Having User Interface With Customizable Data Fields," U.S. patent application Ser. No. 10/405,658, entitled "Logistics Management System Having Task-Oriented User Interface," U.S. patent application Ser. No. 10/403,587, entitled "Logistics Management System Having User Interface With Tiered Data Entry," and U.S. patent application Ser. No. 10/403,657, entitled "Logistics Management System User Interface Having Dynamic Form Configuration," all of which are assigned to the assignee of the present application and incorporated herein by reference in their entirety.

TECHNICAL FIELD

The invention generally relates to logistics management systems and, in particular, user interfaces presented by systems for managing and tracking shipments of freight and other items.

BACKGROUND

One application of logistics management is the management of freight shipments. This process can be complex, and often requires coordination of multiple participants, including freight forwards, carriers, and the like. In addition, the process often requires some form of shipment tracking, capacity control of flights, container control, terminal management, cash management, consolidation, and other common freight management tasks.

To assist with this complex process, logistics management systems have been developed. These systems typically provide computing resources to process freight shipment data, and attempt to aid in scheduling, coordinating and tracking various aspects of the freight shipment. These systems typically require significant data entry, based on current shipping volumes and the number of participants, customers, agents, and other resources that may be associated with the shipments. As a result, relatively untrained individuals may have difficulty understanding and effectively interacting with conventional logistics management systems. Moreover, because of the complexity of the process, the individual is often required to interact with multiple input screens or even multiple systems in order to perform an overall task, such as coordinating shipment of a particular cargo item from an origin to a destination.

SUMMARY

In general, the invention is directed to techniques for network-based management and tracking shipments of freight. More specifically, a logistics management system is described that presents a task-oriented user interface with which authorized users of the system interact to perform a wide-range of tasks associated with shipment management. Exemplary tasks include capture of shipment data, tracking and tracing shipments, capacity control, container control, terminal management, cash management, consolidation, and other common freight tasks.

The logistics management system presents the user interface as a graphical set of interrelated screens. Regardless of the selected task, the logistics management system presents the user interface in a consistent manner that allows the user to perform the task by interacting with a single screen. Each screen includes an item selection region, one or more activity regions, and an action region. The item selection region allows the user to identify one or more "items," e.g., a cargo item, while the activity regions allow the user to provide input data for a defined set of activities or steps associated with the task, i.e., activities necessary for completion of the overall task. As a result, the user can easily complete an overall shipment management task with a single screen, and need not interact with multiple screens to complete the various activities associated with an overall task.

The logistics management system may provide additional functionality to further assist the user in performing logistics management tasks. For example, the user interface may provide dynamic, task-oriented shortcut menus. More specifically, the user may select, e.g., via a "right mouse click," any activity region within a task screen, causing the user interface to present a context-sensitive shortcut menu to related tasks. In response to selection of one of the tasks, the user interface may pre-fill input areas of a subsequent task window with data values computed from the current task screen, and may automatically control flow through the subsequent task screen based on the task screen from which the short-cut menu was launched.

In addition, the logistics management system may present the user interface in a manner that allows the user to selectively display sets of input areas. For example, each activity region of the task-oriented user interface may include an expansion control input to selectively display hidden input areas. The user may interact with the expansion control inputs to selectively "maximize" and "minimize" the input regions. The logistics management system may dynamically control the appearance of the expansion control inputs to include visual aids indicative of whether hidden input areas exist for display, and whether the hidden input areas are preloaded or otherwise include data. In addition, the user interface may allow the user to finely control the specific data fields associated with each activity region associated with a give logistics management task.

To further provide an easy-to-use, yet powerful user interface, the user interface of the logistics management system may provide the user with the ability to dynamically insert sets of input areas into any input region of the user interface. As a result, the user need not be forced to utilize forms having static input lists. Dynamic addition of fields may further provide a non-limiting way of stylizing a user interface such that the interface may be kept simple and uncluttered.

The logistics management system may further provide functionality that allows the user to easily perform a shipment related task on a plurality of items, e.g., cargo, agents, participants, and the like. In particular, the user may select a plurality of items within one or more activity regions of a user interface, and then perform an action to the selected items with a single interaction with an action region of that user interface. In this way, an action may be performed on multiple items related to an overall task with limited user input required, thus achieving increased efficiency. Unlike conventional logistics management systems, the user need not individually select and process each item, which could possibly require the user to interact with a significant number of different screens.

In addition, the user interface modules may provide an automated tiered approach to facilitate efficient data entry. According to the techniques, the user may provide data entry in the form of text-based input, e.g., an airport acronym for an airport, if known. Alternatively, the user may select an item from a subset of available items, which is dynamically maintained based on prior user input. In addition, the user may browse a complete set of available items to populate the input field. In this manner, the tiered approach supports ease of use by individuals having a range of training and expertise.

In one embodiment, a system comprises a host computer that provides logistics management tasks for shipment items, and a user interface module that presents a user interface for the host computer to a remote network user. The user interface module presents a user interface to include an item selection region to receive shipment criteria, one or more activity regions to display a set of shipment items that match the shipment criteria, and an action input region to receive action input specifying one or more logistics management tasks. The host computing system automatically performs the specified logistics management task on a plurality of the items in response to the action input received from a user.

In another embodiment, a method comprises presenting a user interface for a host computer that provides logistics management tasks for shipment items. The user interface includes an item selection region to receive shipment criteria from a remote user, one or more activity regions to display a set of shipment items that match the shipment criteria, and an action input region to receive action input specifying one or more of the logistics management tasks. The method further comprises processing the action input received from the user to automatically perform the specified logistics management task on a plurality of the items.

In another embodiment, a system comprises computing means, network means, and display means. The computing means provides logistics management tasks for shipment items. The network interface means generates a user interface for the computing means. The display means executes on a remote computing device, receives the user interface from the network interface via a network, and presents the user interface to a user. The network interface means generates the user interface to include an item selection region to receive shipment criteria, one or more activity regions to display a set of shipment items that match the shipment criteria, and an action input region to receive action input specifying one or more of the logistics management tasks. The computing means automatically performs the specified logistics management task on a plurality of the items in response to the action input received from the user.

The logistics management system may provide one or more advantages. For example, the task-oriented nature of the user interface facilitates the ease of use of the logistics management system, even by relatively untrained individuals. In particular, the user interface reduces the number of user steps required to perform an activity, such as booking a shipment, and provides increased functionality on a single user interface window. In addition, the techniques may be useful in providing a relatively uncluttered, straightforward user interface that aids a user in performing shipment management tasks, yet provides the ability to expand individual regions as needed to perform more complex activities or provide additional data entry.

Consequently, the system may achieve a reduction in human-related errors, as well reduced training costs. Moreover, by allowing the user to initiate multiple cargo management activities with a single entry, the system may achieve increased employee productivity. Furthermore, the network-based interface may provide easier access from remote locations, and may allow an enterprise to achieve reduced cost associated with deploying and maintaining a more complex system.

These and other embodiments, including other systems, methods and computer-readable mediums that store instructions and data, are described in the specification and claims below. The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 4 illustrates an exemplary task-oriented shortcut menu displayed by the user interface.

FIG. 5 is an example user interface that illustrates navigation through input fields in a different order based on a shortcut menu from which the user interface was reached.

FIG. 7 is a screen illustration depicting an example user interface in which a user may selectively display sets of input areas.

FIGS. 9–10 are screen illustrations depicting example user interfaces in which a user may dynamically add field sets.

DETAILED DESCRIPTION

Figure 1:
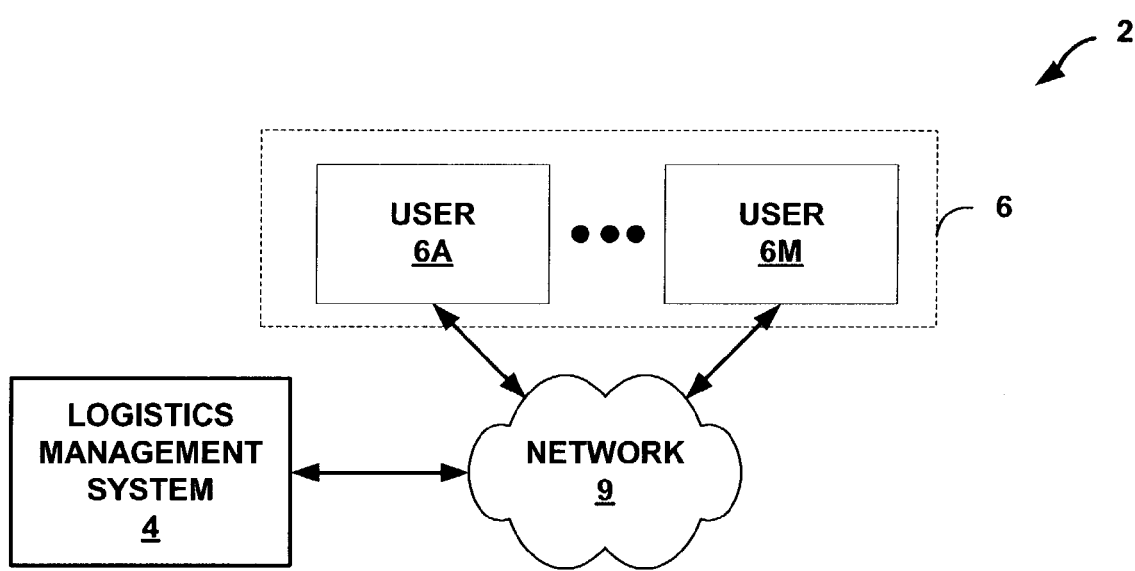
FIG. 1 is a block diagram illustrating an exemplary network-based environment for managing and tracking shipments.

FIG. 1 is a block diagram illustrating an exemplary network-based environment 2 in which logistics management system 4 provides network-based management of freight shipments. As described in detail herein, logistics management system 4 provides a task-oriented user interface with which authorized users 6A–6M (collectively "users 6") of an airline interact with the system to perform a wide range of tasks associated with shipment management. A user may be, for example, a station manager, office personnel, warehouse staff, space control staff, and the like. Exemplary tasks include capture of shipment data, tracking and tracing shipments, capacity control, container control, terminal management, cash management, consolidation, and other common freight tasks.

Logistics management system 4 presents the user interface as a graphical set of interrelated screens. Regardless of the selected task, logistics management system 4 presents the user interface in a consistent manner that allows the user to perform the task by interacting with a single input screen. Specifically, logistics management system 4 presents each screen to include an item selection region, one or more activity regions, and an action region.

In general, the item selection region allows the user to identify one or more "items," e.g., a cargo item, a person, an event, a flight, or the like. The activity regions of the screen allow the user to provide input data for a defined set of activities or steps associated with the task, i.e., activities necessary for completion of the overall task. The action region allows the user to perform one or more actions on the item specified with item selection region based on the data specified within activity regions, thereby completing an overall shipment management task with a single action. In this manner, the user need not interact with multiple screens to complete the various activities associated with an overall task.

The task-oriented nature of the interface provided by logistics management system 4 facilitates ease of use by the users, even by relatively untrained individuals. As a result, logistics management system 4 may achieve a reduction in human-related errors, as well reduced training costs. Moreover, by allowing the user to initiate multiple cargo management activities with a single entry, the system may achieve increased employee productivity.

Each user typically accesses logistics management system 4 via network 9 using a remote computing device having suitable communication software, e.g., a web browser. A user may access logistics management system 4 using a network-enabled computing device, such as a workstation, personal computer, laptop computer, or a personal digital assistant (PDA). The communication device executes communication software, such as a web browser, in order to communicate with logistics management system 4.

Figure 2:
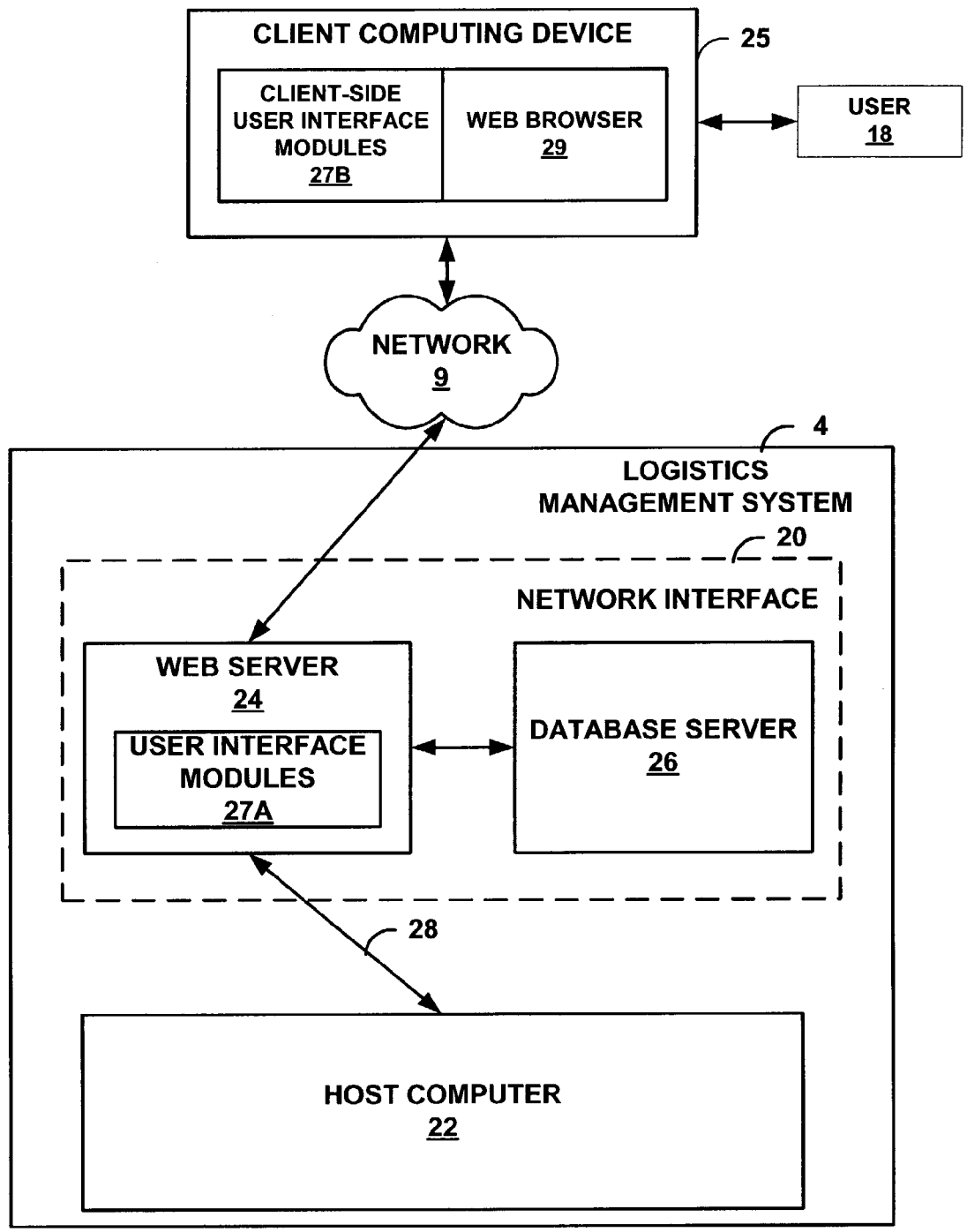
FIG. 2 is a block diagram illustrating an exemplary embodiment of a logistics management system.

FIG. 2 is a block diagram illustrating an exemplary embodiment of logistics management system 4 in further detail. In the exemplary embodiment, logistics management system 4 includes a host computer 22 coupled to network 9 via network interface 20. In general, host computer 22 provides a computing platform for hosting shipment management services for logistics service providers. Host computer system 22 may comprise, for example, a Unisys 2200 series mainframe executing logistics management software.

Network interface 20 comprises one or more computing devices, e.g., web server 24 and database server 26, that cooperate to provide a seamless, network-based interface by which remote user 18 access host computer 22. Although host computer 22, web server 24, and database server 26 are illustrated separately in FIG. 2 for exemplary purposes, logistics management system 4 may be realized by a single computing device or a plurality of cooperating computing devices.

Web server 24 provides a web-based interface by which an authorized user 18 communicates with logistics management system 4 via network 9. In one configuration, web server 24 executes web server software, such as software marketed by Microsoft Corporation under the trade designation "INTERNET INFORMATION SERVER." As such, web server 24 provides an environment for interacting with remote user 18 via user interface modules 27A, 27B (collectively "user interface modules 27"). As described in detail below, user interface modules 27 provide a task-oriented interface with which user 18 interacts to perform a wide-range of tasks associated with shipment management. User interface modules 27 may include Active Server Pages, web pages written in hypertext markup language (HTML) or dynamic HTML, Active X modules, Java scripts, Java Applets, Distributed Component Object Modules (DCOM), and the like.

Moreover, user interface modules 27 may comprises "server side" user interface modules 27A that execute within an operating environment provided by web server 24, "client-side" user interface modules 27B that are downloaded to and executed on a client computing device 25 of remote user 18, or combinations thereof. Client-side user interface modules 27B could, for example, include Active X components or Java scripts executed by web browser 29 executing on client computing device 25.

User interface modules 27 interact with data base server 26 to retrieve user-specific information. For example, user 18 may interact with logistics management system 4 to define a variety of preferences for controlling operation of user interface modules 27. Database server 26 may provide an operating environment for a database management system (DBMS) for storing the user-defined preferences. The database management systems may be a relational (RDBMS), hierarchical (HDBMS), multidimensional (MDBMS), object oriented (ODBMS or OODBMS) or object relational (ORDBMS) database management system.

Figure 3:
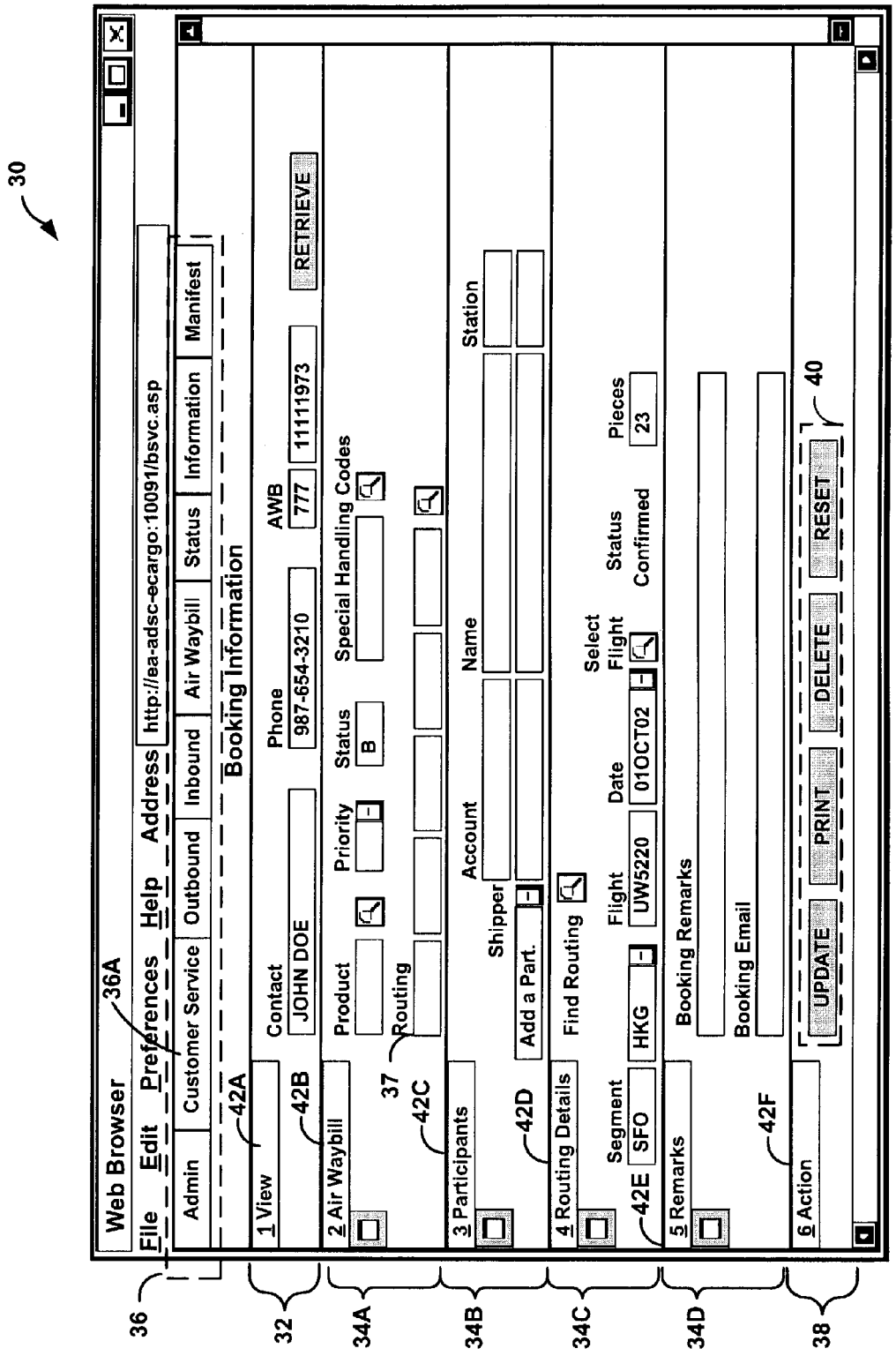
FIG. 3 illustrates an exemplary task-oriented user interface presented by the logistics management system.

FIG. 3 illustrates an exemplary user interface 30 presented by user interface modules 27 for scheduling and tracking shipments. In the illustrated embodiment, user interface 30 provides menu selection buttons 36 for navigating though a variety of shipment management tasks, e.g., administrative functions, customer service functions, management of outbound freight, management of inbound freight, collecting and maintaining air waybill (AWB) charge information, tracking the status of shipments, and the like. Each menu selection button 36 provides a dropdown menu listing one or more tasks. For example, menu selection button 36A provides a selectable list of tasks relating to maintaining bookings and allotments, finding flight information, providing rate and quote information, providing flight reservations, and the like.

Regardless of the function selected by user 18, user interface modules 27 present user interface 30 in a consistent, task-oriented manner. In particular, as with other input screens presented by user interface modules 27, user interface 30 is divided into at least three regions. An item selection region 32 allows the user to provide an identifier or other information describing one or more "items," e.g., a cargo item, a person, an event, a flight, or the like. For example, in the exemplary user interface 30 of FIG. 3, item selection region 32 includes input areas for specifying a contact for an air waybill (AWB). Upon receiving input from user 18 via item selection region 32, web server 24 accesses host computer 22 to retrieve data associated with the specified item.

User interface 30 further includes one or more activity regions 34 for performing a defined set of activities or steps associated with a common task. In particular, user interface 30 presents activity regions 34 within a single window to allow user 18 to perform a complete task for the item specified within item selection region 32. In this example, user interface 30 includes activity regions 34A–34D to capture activity data for performing an overall task associated cargo booking, e.g., creation, modification or deletion of booking activities for the identified item.

More specifically, activity regions 34A–34D present separate input regions that enable user 18 to complete all activities associated with booking a cargo item. Activity region 34A provides input areas with which user 18 interacts to specify an AWB, including a product, priority, status, handling codes, and a complete routing summary 37 that sequentially lists the origin, intermediate, and final destinations of the booked item. Activity region 34B provides input areas by which the user 18 specifies "participants" for the booking, e.g., a shipper, a consignee, an agent, and the like. Activity region 34C provides input regions by which user 18 specifies individual segments for carrier routes to transport the item. Activity region 34D provides input areas by which user 18 specifies general remarks for the booking.

In this manner, user 18 need not interact with multiple screens to complete the booking. Moreover, activity regions 34A–34 may be hierarchically arranged from top to bottom of user interface 30 based on the order in which a user must complete the activities, thus increasing the intuitive nature of user interface 30. For example, user interface 30 may require that user 18 provide routing information 37 prior to allowing the user to select participants via activity region 34B. Similarly, user interface 30 may require that user 18 select participants via activity region 34B prior to allowing the user to specify segment details via activity region 34C.

Finally, user interface 30 includes an action region 38 to perform one or more actions on the item specified with item selection region 32 based on the data specified within activity regions 34. In this example, action region 38 includes selectable buttons 40 that allow user 18 to update, delete, reset and print the selected item.

To further aid in the intuitive, task-oriented nature of user interface 30, user interface modules 27 include respective headers 42A–42F within each of the input regions 32, 34, 36, and may color-code the headers. For example, header 42A of input selection region 34 and header 42F may be presented in a first color. Headers 42B–42E of activity regions 34 may be presented in a second color. Moreover, each header 42 of user interface 30 may be presented in similar manner regardless of the particular screen being displayed, i.e., the function selected via menus 36.

In addition, user interface 30 makes use of dynamic, task-oriented shortcut menus to aid user 18. More specifically, user 18 may select, e.g., via a "right mouse click," any of regions 32, 34 and 38 to request a shortcut menu to other related tasks. In response, user interface 30 presents a context-sensitive, task-oriented shortcut menu.

Figure 4:
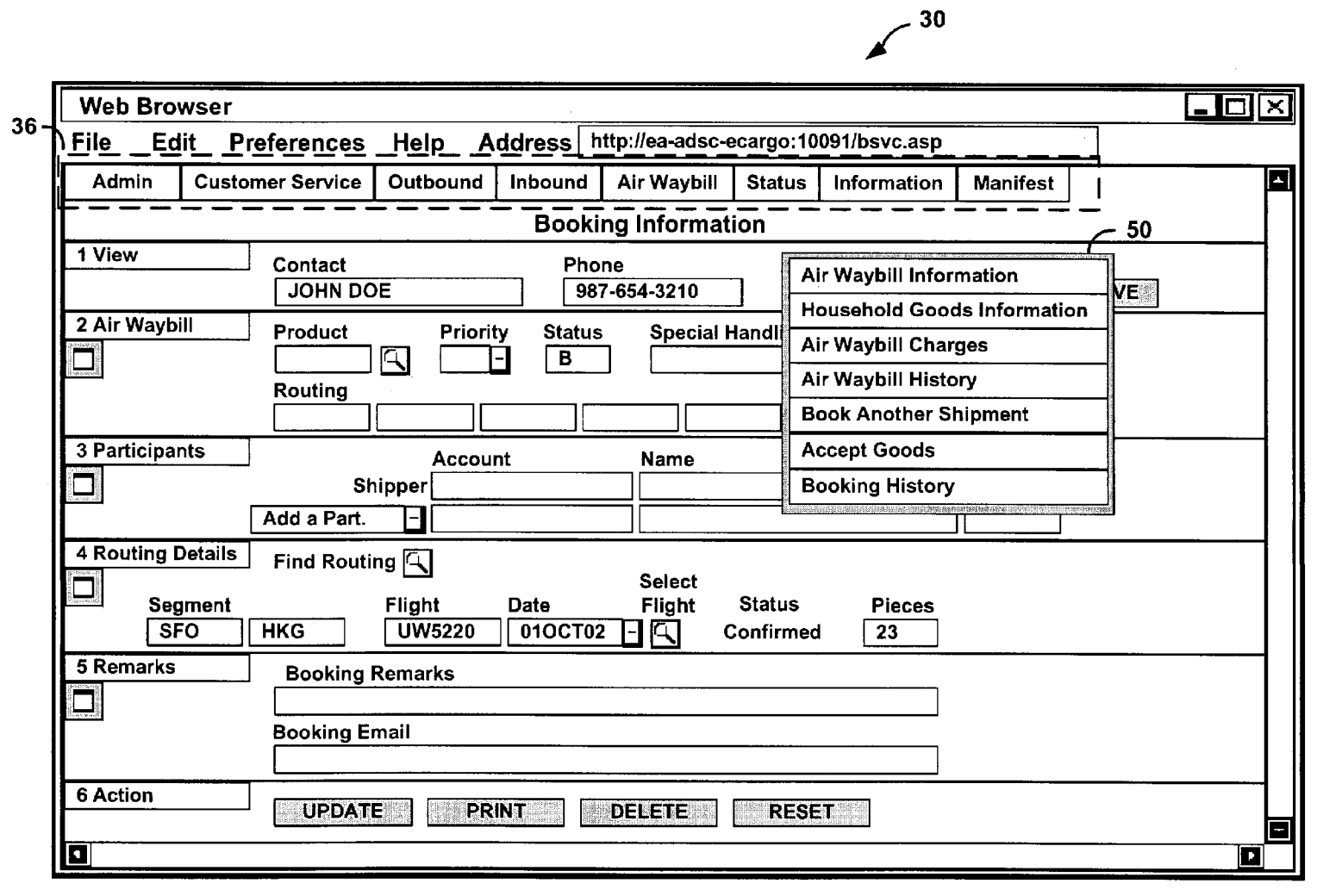

FIG. 4 illustrates an exemplary shortcut menu 50 displayed by user interface 30. In this example, user interface 30 presents shortcut menu 50 to include direct links to other tasks provided by logistics management system 4 that are related to the current task being performed via user interface 30. For example, because user interface 30 includes activity regions 34 that relate to the task of booking an item, shortcut menu 50 includes links to other related tasks, e.g., accept goods, view booking history, view all AWB information, view goods information, view AWB charges, view AWB history, and book another shipment. When user 18 is viewing an existing booking, he or she may want to view the booking history, view all the charges associated with the shipment, or accept the goods at a warehouse. Although user 18 may navigate to these tasks via menu selection buttons 36, use of shortcut menu 50 avoids any requirement that the user be familiar with the location of the screens in the menu bar structure and the overall task flow. By making use of shortcut menu 50, user interface modules 27 are able to guide user 18 through a flow of tasks, and allow the user to navigate between screens in a task-oriented manner without requiring the user to have detailed knowledge of menus 36.

Moreover, after activating a shortcut menu to another task, user interface modules 27 pre-fill data values of input areas for the new task according to the screen from which the shortcut menu was launched, e.g., user interface 30. More specifically, data provided in item selection region 32 may be used to automatically populate the item selection region for the subsequent task window. Similarly, data from activity regions 34 may be used to populate activity regions for the subsequent task window. During this process, user interface modules 27 may process data from activity regions 34 to compute or otherwise determine the data for the subsequent activity regions.

Another manner in which user interface modules 27 generate user interface 30 to provide a task-oriented interface is via intelligent cursor control. In response to a tab key input, user interface 30 moves between input areas, but controls the cursor to flow through regions 32, 34, 26 in a manner that corresponds to the logical progression of the activities associated with the task. For example, in some cases the flow of a particular task may dictate that a first field appearing lower on user interface 30 be supplied with data before another field appearing above the first field. In this situation, user 18 can employ the tab key to automatically move to the lower first field prior to the other field, without having to remember the order in which the activities of the task should be completed.

In addition, this functionality can be used to aid user 18 when a shortcut menu, e.g., shortcut menu 50, is employed. In particular, in response to the right click or the context menu key input, user interface modules 27 control the navigation through the fields of a subsequent screen based on the shortcut menu that is used to navigate to the screen. For example, assuming user 18 selects "AWB Charges" from shortcut menu 50, user modules 27 will display a subsequent user interface, and control the navigation through the input areas of the subsequent user interface, based on the fact that the user reached the current interface via a shortcut menu from user interface 30, i.e., the Booking Information interface. That is, user interface modules 27 will control the navigation through the AWB Charges interface based on the fact that a booking-type task is underway or was recently performed by user 18.

In this manner, logistics management system 4 provides a task-based interface that helps guide user 18 through a particular task. These techniques allow a user to easily navigate within a particular screen, e.g., web page, and to screens of related tasks.

Figure 5:
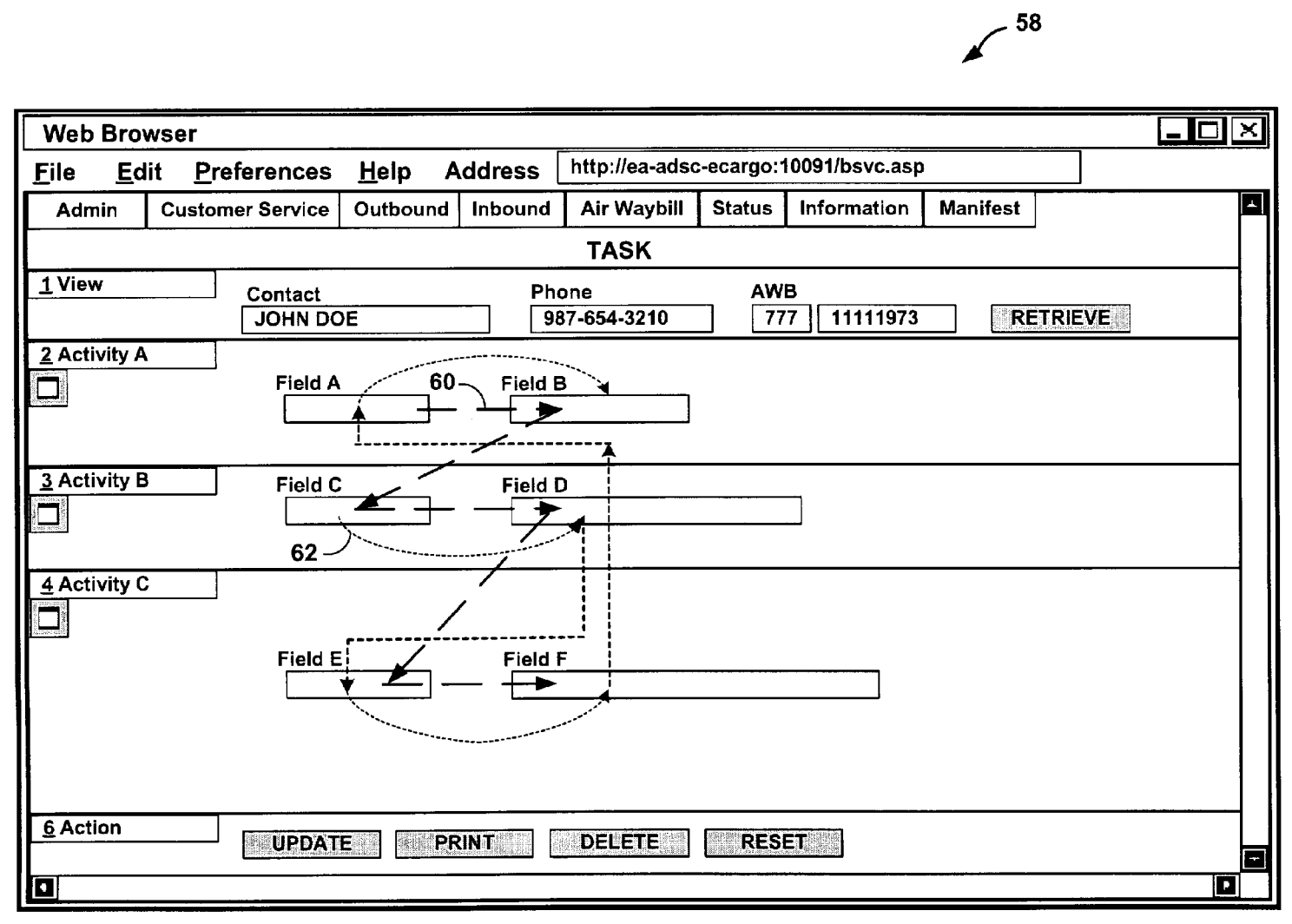

FIG. 5 is an example user interface 58 that illustrates navigation through input fields A–F in a different order based on the shortcut menu, e.g., shortcut menu 50, from which the interface was reached. In this example, user interface modules 27 generate user interface 58 to support a first navigation order 60 (Field A→Field B→Field C→Field D→Field E→Field F) when reached from a first shortcut menu, and a second navigation order 62 (Field C Field D→Field E→Field F→Field A→Field B) when reached from a second shortcut menu.

Figure 6:
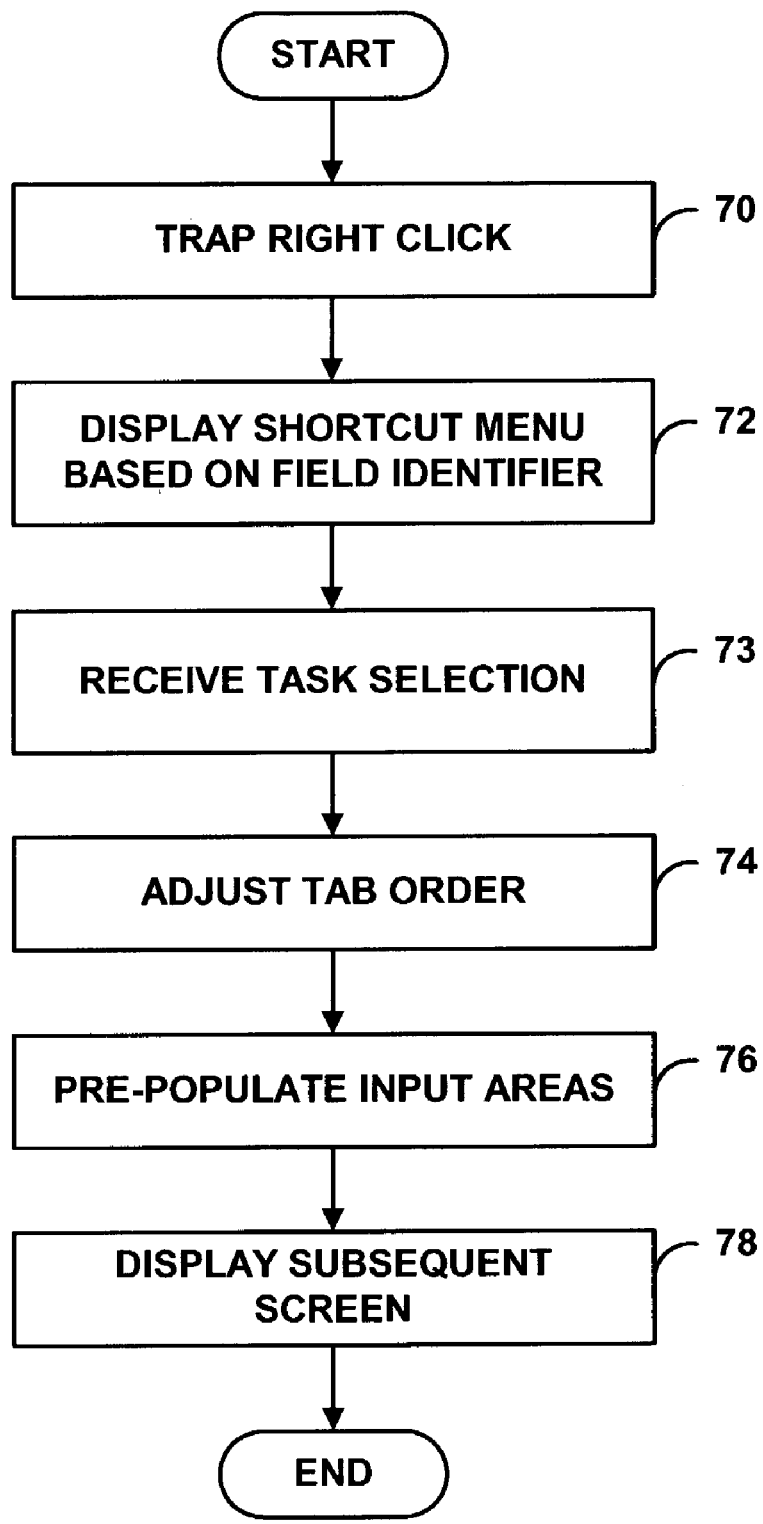
FIG. 6 is a flowchart illustrating example operation of the user interface when controlling navigation from one task-oriented user interface to another.

FIG. 6 is a flowchart illustrating example operation of user interface modules 27 when controlling the navigation from one task-oriented user interface, e.g., user interface 30, to another. Initially, client-side user interface modules 27B, e.g., Java scripts, sense a right mouse click over an input area, and determine the particular input area based on a field identifier (70). In response, user interface modules 27 automatically generate and display a shortcut menu, e.g., menu 50, to include a list of links to tasks related to the identified field, and may order the links within the shortcut menu based on an order in which the related tasks should be performed (72).

Next, user interface modules 27 receive a selection of one of the tasks listed in the shortcut menu, and begin generating a new user interface, e.g., web page, for the selected task (73). During this process, user interface modules 27 adjust a tab order for the new user interface based on the shortcut menu used (74), pre-populate input areas of the user interface with data computed or otherwise determined from the previous interface (76), and display the user interface for the selected task (78).

In addition to the above-described techniques, user interface modules 27 may generate a task-oriented user interface, e.g., user interface 30, in a manner that allows user 18 to selectively display the input areas defined for regions 32, 34, 38. For example, user interface modules 27 may generate each activity region 34 to define a first set of input areas that are initially displayed to user 18, and a second set of input areas that are "hidden." Moreover, user interface modules 27 may generate each activity region 34 to include an expansion control input to selectively display the hidden input areas. In this manner, user 18 may interact with the expansion control inputs to selectively "maximize" and "minimize" the input regions. User interface modules 27 may generate the expansion control inputs to include visual aids indicative of whether hidden input areas exist for display, and whether the hidden input areas are preloaded or otherwise include data.

These techniques may be advantageous in logistics management and other applications that often require substantial data entry by relatively untrained users. In particular, the techniques may be useful in providing a relatively uncluttered, straightforward user interface that aids a user in performing shipment management tasks, yet provides the ability to expand individual regions as need to perform more complex activities or provide additional data entry.

Figure 7:
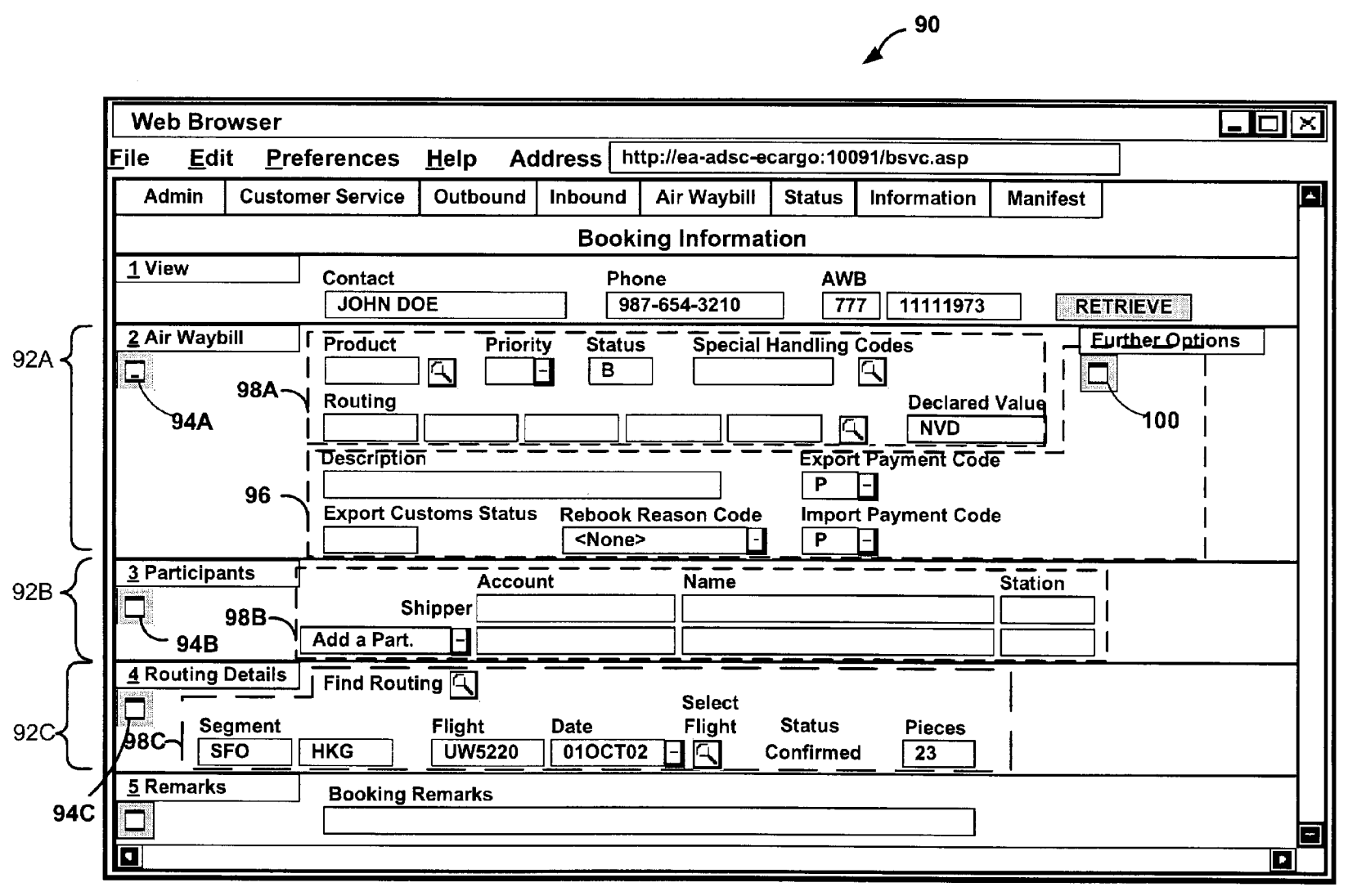

FIG. 7 is a screen illustration depicting an example user interface 90 in which user 18 may selectively display sets of input areas for each of activity regions 92A–92C ("activity regions 92"). In this example, each activity region 92 comprises a respective default set of input areas 98A–98C ("default sets 98"). Initially, user interface modules 27 generate activity regions 92 to display the default sets 98. Additionally, user interface modules 27 may generate activity regions 92 to include extended sets of input areas that are initially hidden from user 18.

Each activity region 92 includes a respective expansion control input 94 with which user 18 interacts to selectively display the respective extended set of input areas. As illustrated by FIG. 7, activity region 92A includes a default set of input fields 98A which is initially displayed. In addition, activity region 92A includes an extended set of input areas 96. Although initially hidden, user 18 may direct user interface 30 to display the extended set of input areas 96, as illustrated in FIG. 2, by interacting with expansion control input 94A.

In this illustrated example, user interface modules 27 generate expansion control inputs 94 as a button or other graphical icon. In response to user selection of expansion control inputs 94, client-side user interface modules 27B dynamically enable and disable the display of the respective extended sets of input areas without requiring communication with logistics management system 4.

To facilitate this dynamic behavior, user interface modules 27 may generate user interface 90 in dynamic HTML and in conformance a Document Object Model (DOM) in which each "element" of user interface 90 is defined by a respective "object." For example, the DOM for user interface 90 may define respective objects for each expansion control input 94, as well as for each input area, whether initially displayed or hidden. Moreover, user interface modules 27 generate the objects to define a various properties, which can be dynamically manipulated by client-side software modules. Thus, each individual object may be programmable, and can be selectively configured based on input received from user 18.

In particular, user interface modules 27 generate user interface 90 as a web document, and in accordance with a DOM that provides a tree-like model for the entire document in which every node of the tree is an object that represents an element of user interface 90, e.g., an HTML tag, or a textual entry inside an HTML tag. In this manner, the tree-like model describes the entire document, including relationships between tags and textual entries on the page. Nodes within the tree may be related as child, parent, or sibling nodes.

In general, to dynamically display and hide sets of input areas, client-side user interface modules 27B navigate the document tree, and manipulate the nodes of document tree. Specifically, user interface modules 27 define "containers" for each of the sets of input areas 96, 98. Each container provides set-wise control over the document nodes associated with the respective input areas 96, 98. For example, user interface modules 27 may generate the document to define a first container for manipulating nodes associated with default set 98A.

In addition, user interface modules 27 define a "style.display" property for each node associated with the input areas. By controlling this display property for each container, client-side user interface modules 27B selectively display or hide the entire container of objects without interacting with logistics management system 4.

To further aid user 18, client-side user interface modules 27B maintain and update the appearance of the expansion control inputs 94 to provide visual indicates of a "state" of the respective extended set of input areas for each activity region 92. In particular, client-side user interface modules 27B update the appearance of each of expansion control inputs 94 based on whether the respective extended set of input areas is currently hidden or displayed, and whether any of the extended set of input areas contain data. Consequently, the visual appearance of an expansion control inputs 94 may assist user 18 in determining whether to selectively expand activity regions 92, and in determining which actions will be performed when the expansion control inputs are selected. The following table summarizes the various states maintain by client-side user interface modules 27B for each extended set of input areas 96, and lists respective visual appearance of the associated expansion control input 94 and the resulting action:

TABLE 1

| STATE | DISPLAY PROPERTY | DATA PROPERTY | EXPANSION CONTROL APPEARANCE | ACTION IF SELECTED |
|---|---|---|---|---|
| 1 | HIDDEN | EMPTY | MINIMIZED ICON, FIRST COLOR | DISPLAY EXTENDED INPUT AREAS |
| 2 | DISPLAYED | EMPTY | MAXIMIZED ICON, FIRST COLOR | HIDE EXTENDED INPUT AREAS |
| 3 | DISPLAYED | DATA | MAXIMIZED ICON, SECOND COLOR | DISPLAY EXTENDED INPUT AREAS |
| 4 | HIDDEN | DATA | MINIMIZED ICON, SECOND COLOR | HIDE EXTENDED INPUT AREAS |

As illustrated in Table 1, when extended set of input areas 96, for example, is in a first state, user interface modules 27 display expansion control input 94A using a "minimized" icon having a first color. If user 18 were to select expansion control input 94A while user interface 90 is in this state, client-side user interface modules 27B executing on a computing device of user 18 automatically displays extended set of input areas 96. In other words, no communication need occur between the client device and logistics management system 4, as the extended input areas are already defined within user interface 90. In addition, a state transition occurs from the first state to the second state, causing client-side user interface modules 27B to update expansion control input 94A to a "maximized" icon having a first color.

In this manner, client-side user interface modules 27B update the appearance of expansion control inputs 94 to provide visual aids to user 18 regarding hidden input areas. As described, the use of different graphic icons may be used to indicate whether a maximize or minimize action will result, i.e., whether the extended set of input areas will be displayed or hidden. Moreover, the color of expansion control inputs 94 may further indicate status information to the user regarding the contents of the extended input areas, i.e., whether the input areas contain data. By representing this information in a graphical manner the display may remain uncluttered and efficient in nature. User 18 can quickly view an entire screen, and verify the status and actions of various regions within the interface.

These techniques may be further used so as to "nest" extended sets of input fields. For example, as illustrated in FIG. 7, extended set 96 may further include an expansion control input 100 that allows user 18 to selectively display an additional "hidden" set of input areas. As a result, a particular set of input areas may contain a plurality of expansion control inputs to allow user 18 to selectively display respective hidden sets of input areas. Consequently, a multi-level hierarchy of hidden sets of input areas may be defined to provide user 18 with great flexibility and control over the presentation of task-based user interface 90. To further aid this process, user interface 90 may include an input mechanism, e.g., a button or other graphical icon, that allows user 18 to store a current configuration of expansion control inputs 94. In particular, user 18 may manipulate the multi-level hierarchy of expansion control inputs 94 to display and hide the respective input area sets, and select the input mechanism to save the current configuration. Client-side user interface modules 27B communicate with logistics management system 4, and update user preferences stored by database server 26 to store the configuration.

In addition, user interface modules 27 may automatically determine the hidden sets of input fields and displayed sets of input fields based on the task-based nature of the user interface. As user 18 navigates the user interface via task-based shortcut menus, as described above in reference to FIG. 4, user interface modules 27 may dynamically select which sets of input areas to display, and which sets to initially hide. For example, as a user navigates from a first screen to a second screen, user interface modules 27 may generate the second screen to automatically display certain extended sets of input areas based on the shortcut menu that is used to navigate to the screen because the user is likely performing a task related to the first screen.

Figure 8:
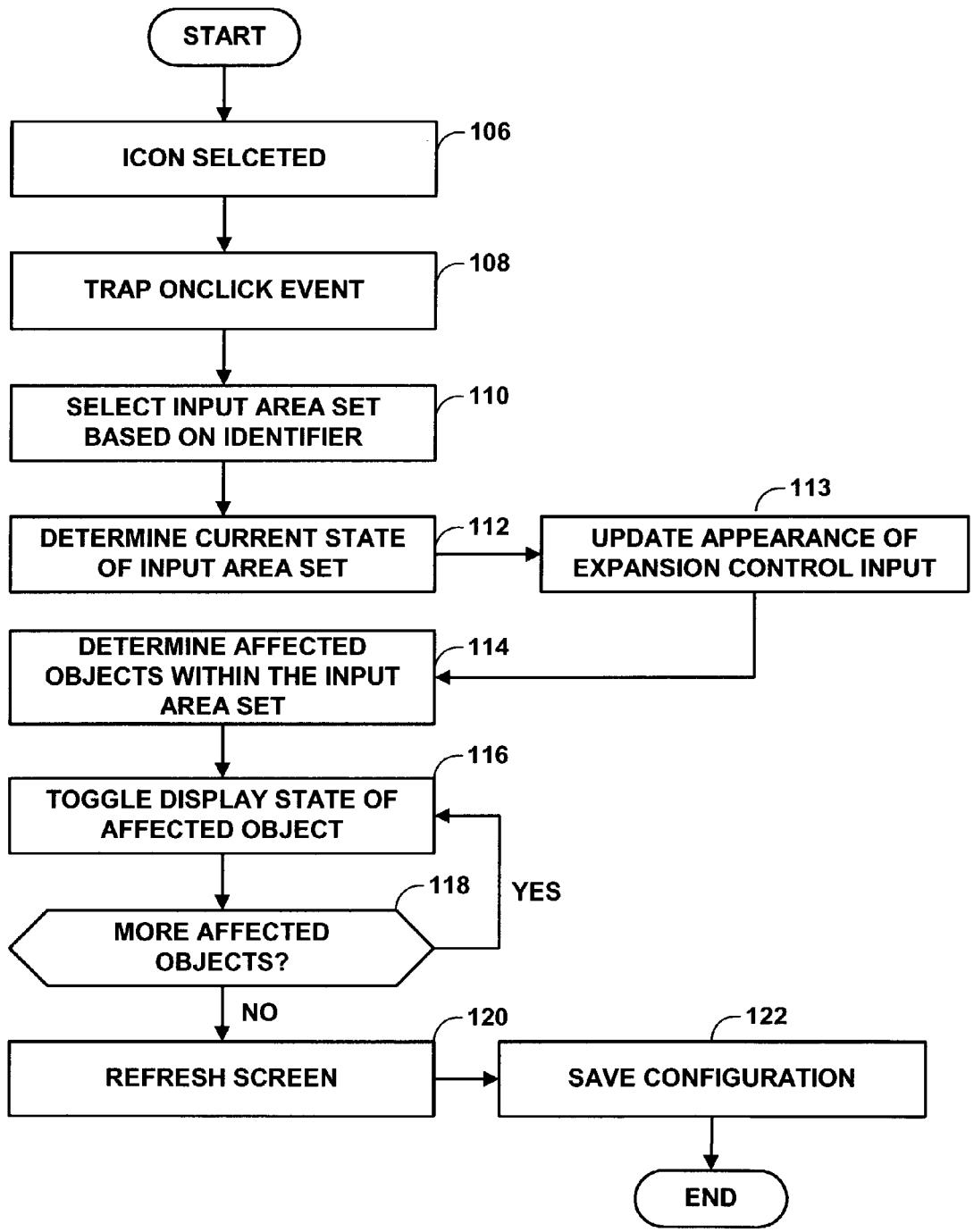
FIG. 8 is a flowchart illustrating exemplary operation of expansion control features of the user interface presented by the logistics management system.

FIG. 8 is a flowchart illustrating exemplary operation the expansion control features of the user interface presented by logistics management system 4. More specifically, the flowchart illustrates operation of client-side user interface modules 27B, e.g., Java scripts, that dynamically display input regions of a web page or other document generated by the logistics management system 4.

Initially, client-side user interface modules 27B are triggered in response to input from user 18. For example, user 18 may select an expansion control input 94 (106), causing client-side user interface modules 27B to trap an "OnClick" event (108). Specifically, an event handler of the web browser passes the document node associated with the selected expansion control input 94 that generated the event. An identifier attribute, referred to herein as a "set identifier," within the node identifies which set of input areas the selected icon relates (110).

Next, the calling code determines the state of the section (112). For example, the state of the set may be determined by examining the attributes controlling the visual appearance of the selected expansion control input 94. Because the visual attributes are controlled as a function of the current state of the input area set, the attributes serve to identify the current state. After determining the state, the client-side user interface modules 27B perform a number of actions to change the state of the respective set of input areas.

Specifically, the invoked client-side user interface module 27 updates the visual appearance of the selected expansion control input 94 to reflect the state change caused by the user input (113). For example, as described above, client-side user interface module 27 may select a maximize or minimize icon based on the new state of the set of input areas. In addition, the client-side user interface module 27 may set the color of the selected icon based on whether data is present in the set of input areas.

Next, the client-side user interface module 27 determines which of the objects defined within the Document Object Model (DOM) are associated with the set of fields being manipulated (114). For example, the client-side user interface module 27 may traverse the DOM to identify the set of objects having a set identifier that match the set identifier of the object related to the selected expansion control input 94. Alternatively the client-side user interface module 27 may associate a static, pre-defined set of objects with the set identifier.

Once the objects are identified, the client-side user interface module 27 updates the display property of each object to dynamically hide or display the object (116). During this process, the client-side user interface module 27 may traverse the list of collected objects and update the display property of each node until all nodes in the list have been updated (118).

During this process, the client-side user interface module 27 generates new code, e.g., HTML, for display by the web browser. Finally, the client-side user interface module 27 refreshes the user interfaces 90 to dynamically update the set of input areas (120). Optionally, the client-side user interface module 27 may communicate with logistics management system 4 to save the updated screen configuration (122). For example, logistics management system 4 may store user preferences that define default display attributes, e.g., displayed or hidden, for each of the sets of input areas of user interface 90.

In this manner, user interface modules 27 of logistics management system 4 may generate a task-oriented user interface, e.g., user interface 90, to include expansion control inputs that allows user 18 to selectively display defined sets of input areas of associated with activity regions 34, thus "maximizing" and "minimizing" the input regions as desired. Moreover, user interface modules 27 may generate the expansion control inputs to include visual aids indicative of whether hidden input areas exist for display, and whether the hidden input areas are preloaded or otherwise include data. These techniques allow logistics management system 4 to provide a relatively uncluttered user interface in which individual activity regions 34 may be expanded as needed to perform more complex activities or provide additional data entry. Furthermore, user 18 may save the configuration to control future interactions with logistics management system 4 via the particular screen.

To further provide an easy-to-use, yet powerful user interface, logistics management system 4 provides user 18 with the ability to dynamically insert sets of input areas into an input region. The dynamic insertion of the set of input fields may be initiated by user 18 by way of an input mechanism such as a button, drop-down list, check box or the like.

Figure 9:
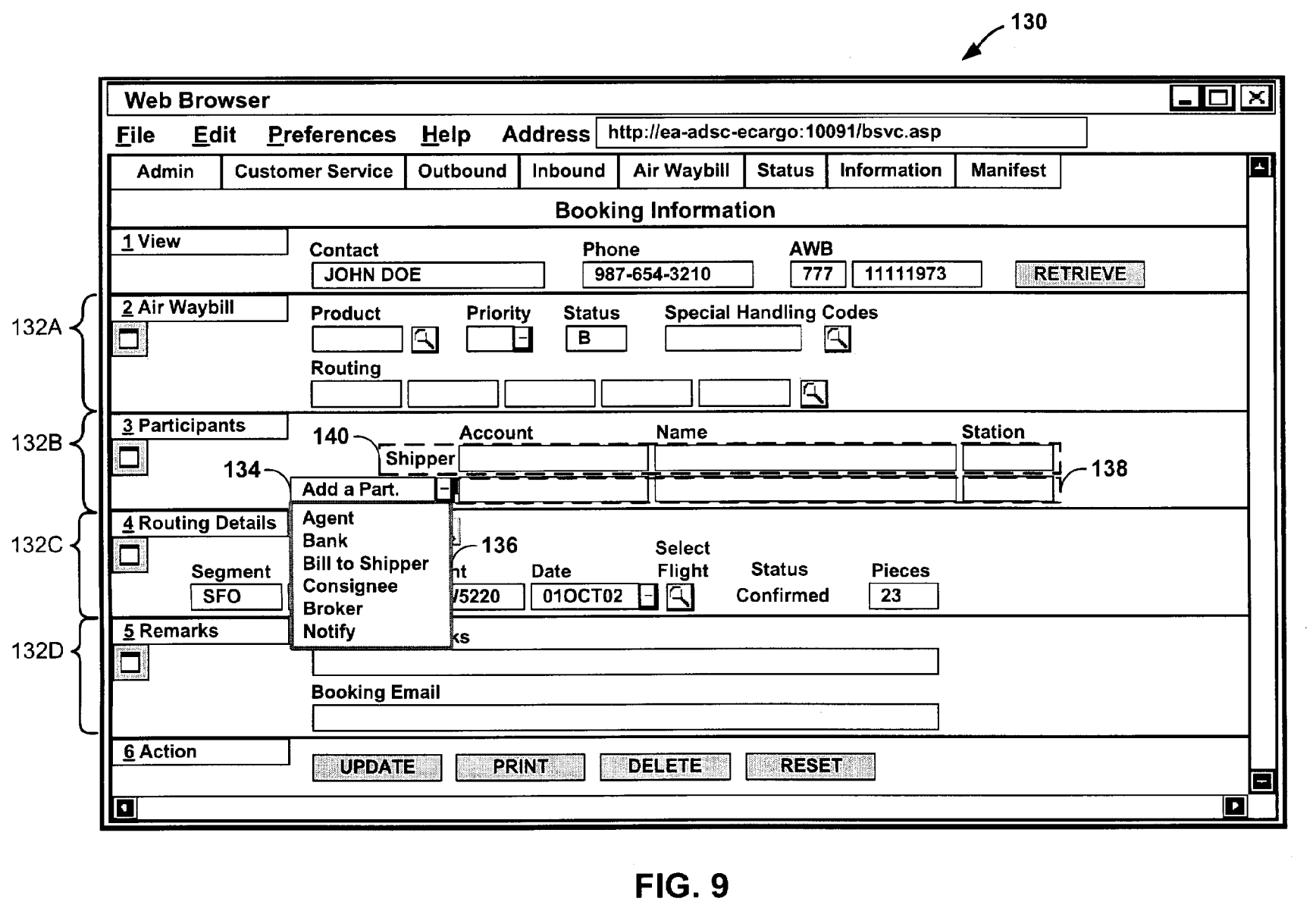

FIG. 9 is a screen illustration depicting an example user interface 130 in which user 18 may dynamically add field sets for activity regions 132A–132D (collectively "activity regions 132"). In this example, activity region 132B comprises a field set insertion control 134, illustrated for exemplary purposes as a drop-down list, as a mechanism for selectively adding a set of input fields 138.

As illustrated, activity region 132B initially displays an initial field set 140 with which user 18 interacts to define a participant, e.g., a shipper, for providing shipping services. In addition, field set insertion control 134 provides a drop-down list of field set selections 136 upon receiving input, e.g., a left mouse click, from user 18.

Field set selections 136 provide a list of field sets that relate to activity region 132B, i.e., "Participants," and are available for dynamic insertion. In this example, field set selections 136 include a variety of participants, such as an Agent, Bank, Bill to Shipper, Consignee, Broker and Notify. Although illustrated by way of example with reference to a drop-down menu, field set insertion control 134 may be any of a variety of input mechanisms, such as buttons, check boxes, and the like.

To dynamically insert a field set, user 18 selects an item from field set selections 136. In response, a corresponding client-side user interface module 27 determines which field set the user selected, and dynamically inserts the selected field set to field set list of activity region 132B. For example, if the client-side user interface module 27 receives, e.g., a left mouse click, selecting the field set "Agent," the user interface module dynamically creates objects within the underlying Document Object Model to insert the appropriate set of fields corresponding to the selection. The client-side user interface module 27 then refreshes user interface 130 to display the newly inserted field set. In some embodiment, activity region 132B may include a default group of field sets, including a field sets for a Shipper and a Consignee. Additional field sets for other participants may be added to the default field sets.

Figure 10:
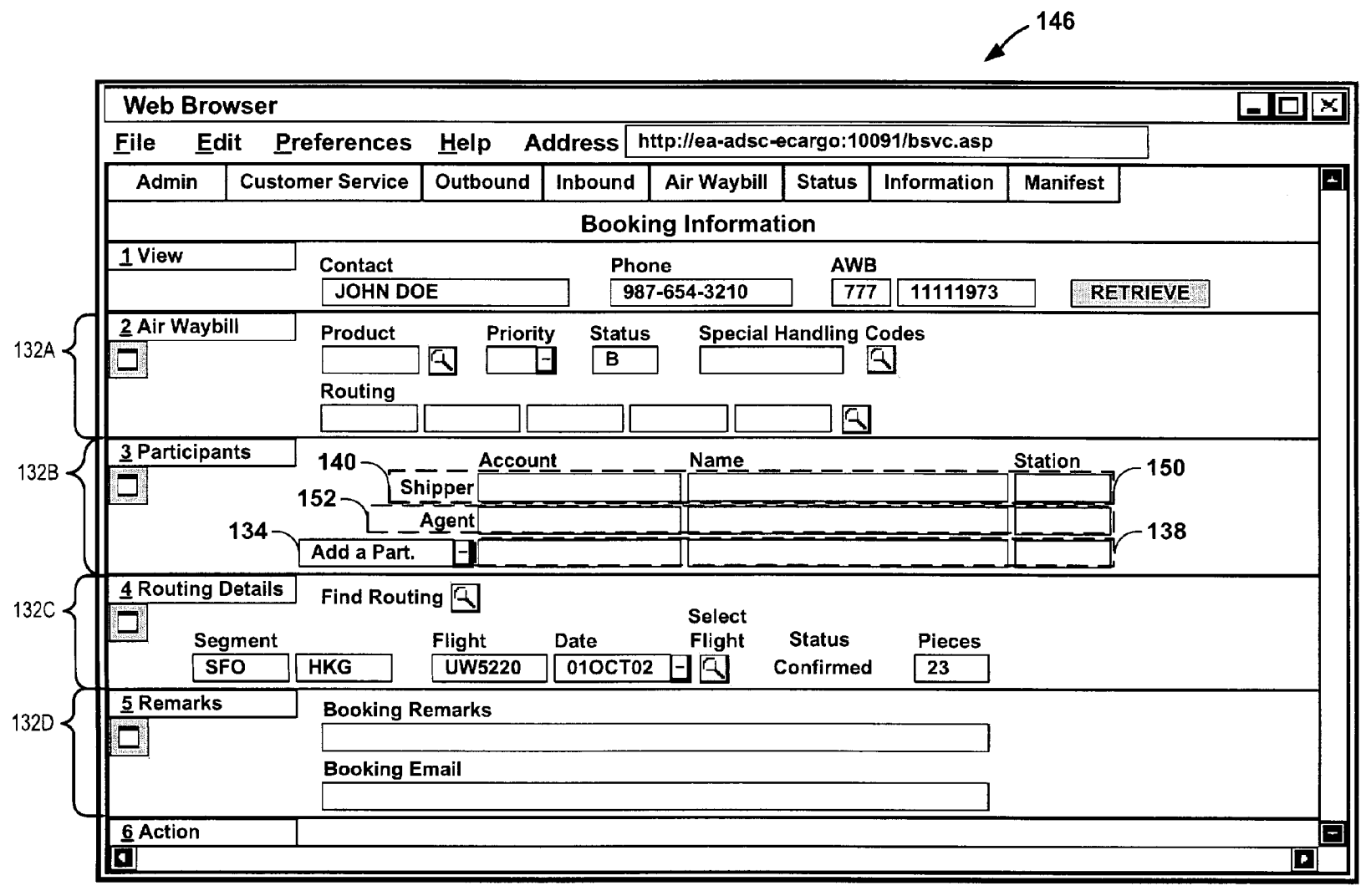

FIG. 10 is a screen illustration depicting a user interface 146 displayed by the client-side user interface module 27 when user 18 selects "Agent" from field set selection list 136 (FIG. 9) presented by user interface 130. This exemplary screen shows the dynamic addition of field set 150, which includes an "Agent" label 152, an account input field, a name input field and a station input field.

Also shown in this example is the movement of field set insertion control 134 and its associated field set, field set 138, to a new location. In this example, the new location is shown to be below the newly added field set 150, and the initial field set 140. As a result, user 18 may repeat the above-described process to insert addition field sets for defining participants within activity region 132B. The client-side user interface module 27 may disable the drop-down list after the number of field sets within activity region 132B reaches a pre-defined maximum number. For example, a maximum number may be defined to maintain the uncluttered look and task-oriented nature of user interface 146. User interface modules 27 may allow a user, such as an administrator, to define the maximum number, or the number may be statically defined. When the number of dynamically inserted field sets reaches the maximum, the client-side user interface module 27 may disable field set insertion control 134.

As the dynamic addition of field sets continues, the activity region to which the field sets are added may expand. In this example, the client-side user interface module 27 automatically expands activity region 132B to accommodate the addition of the field set 150. Automatic resizing of the active region aids user 18 by allowing for all pertinent fields to be displayed and visible to user 18. Alternatively, the client-side user interface module 27 may generate user interface 146 to include scroll bars for activity region 132B, but this may limit the efficiency of the interface to user 18.

Figure 11:
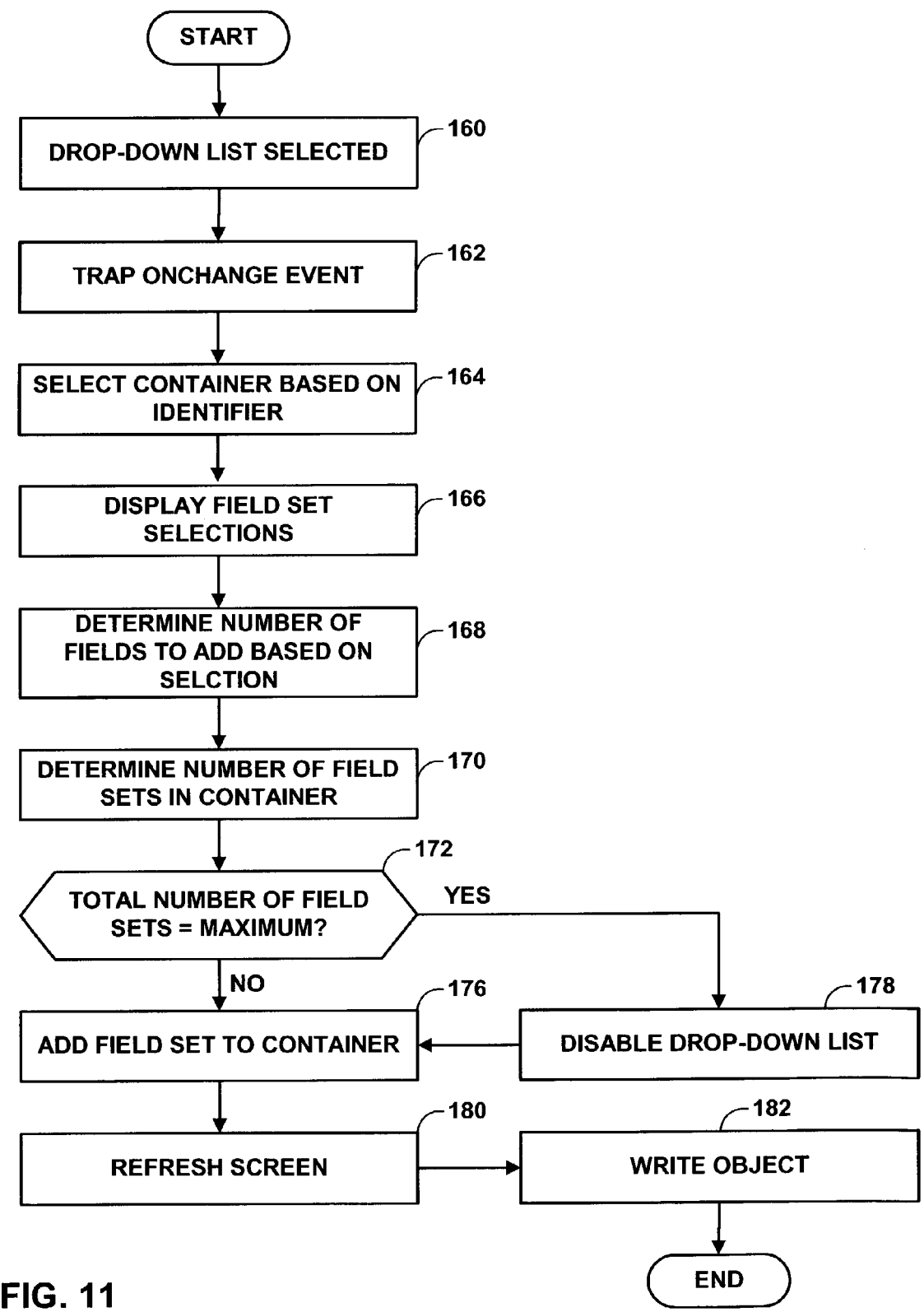
FIG. 11 is a flowchart illustrating exemplary operation of a client-side user interface module to dynamically insert a field set within a user interface presented by the logistics management system.

FIG. 11 is a flowchart illustrating exemplary operation of a client-side user interface module 27 to dynamically insert a field set to an activity region within a user interface presented by logistics management system 4. As described, a web browser executing within an operating environment of a client computing device 25 of user 18 initially downloads and presents user interface 130. User interface 130 may adhere to the DOM (Documents Object Model), as described above.

Consequently, field set insertion control 134 may be associated with an object within the DOM, and properties associated with the drop-down list may contain a link to call a specific client-side user interface module 27, e.g., a Java script.

Initially, user 18 may access field set insertion control 134, e.g., via a left mouse click within the area of the drop-down list (160). Upon reception of the selection, an event handler of the web browser may trap a triggered event, e.g., an "onChange" event (162), which is generated by user interface 130. In particular, the on Change event may be triggered by a selection of user 18 that changes property of an object associated with input mechanism 134. The onChange event also might include events relevant to other input mechanisms. For example, a selection of a check box may trigger the on Change event trapped by the client-side user interface module 27.

In response, the invoked client-side user interface module 27, displays a drop-down menu listing field set selections 136 (166). Specifically, the client-side user interface module 27 receives an object identifier for the field set insertion control 134 from the event handler, and selects a respective "container" of objects for field set selections 136 based on the identifier (164). The client-side user interface module 27 displays the selected container to present field set selections 136 to user 18 (166).

After displaying field set selections 136, another client-side user interface module 27 is invoked when user 18 selects one of the displayed field set selections 136. In particular, an "onClick" event may be triggered by user interface 30 and trapped by the event handler when user 18 selects an item within field set selections 136. The client-side user interface module 27 may determine the item selected using position information gathered from the on Click event.

Once the client-side user interface module 27 determines the selected field set, the client-side user interface module determines the number of fields to be added (168). For example, the selection of "Agent" from field set selections 136 requires the addition of two fields, while the selection of "Bank" requires three additional fields. In one embodiment, the client-side user interface module 27 makes use of a property for the selected object that stores the number of fields to add. For example, an object associated with the selected item "Bank" may have a property to indicate the three fields must be added for the field set.

Next, the client-side user interface module 27 determines the current number of field sets in the activity region, e.g., activity region 132B, to which the selected field set is to be inserted. For example, an object "container" may be defined to hold any dynamically inserted field sets, and may include a property to describe the current number of contained field sets. Using this property, the client-side user interface module 27 may determine whether the number of field sets in the container exceeds a maximum number of field sets allowed (170, 172). Alternatively, the client-side user interface module 27 may determine whether a maximum number of field sets have been inserted.

Once the total number of field sets reaches a maximum number of field sets, the client-side user interface module 27 disables field set insertion control 134 (178), e.g., by changing a property associated with an object associated with field set insertion control 134 to "disabled." If the total number of fields does not exceed or meet the maximum, then the client-side user interface module 27 dynamically adds a field set corresponding to the selection to the container (176). Specifically, the client-side user interface module 27 traverses the objects associated with the currently defined field sets until a null child object is found. In other words, the client-side user interface module 27 traverses the objects defining the field sets until reaching the end of the last field set within activity region 132B. Each object may represent an entire field set, also referred to as a "line," within activity region 132B.

After finding the null child object, the client-side user interface module 27 makes a duplicate of the non-null child object, and links the duplicate to the current null child object. In this manner, the client-side user interface module 27 inserts a "place holder" for a new field set within activity region 132B. The client-side user interface module 27 then changes the properties of the copied object to reflect the selection within field set list 136. Finally, the client-side user interface module 27 updates the properties of the container that encompasses all of the field sets. For example, the client-side user interface module 27 updates the property that indicates the total number of fields currently within the container based on the newly added field set.

Finally, the client-side user interface module 27 refreshes the screen to display the changes to the container, i.e., the dynamically inserted field sets (180). Optionally, the client-side user interface module 27 may communicate with logistics management system 4 to store the current configuration of user interface 146 for later interaction with user 18, e.g., as user preferences (182).

In this manner, logistics management system 4 allows user 18 to dynamically add field sets to the user interface. As a result, user 18 need not be forced to utilize forms having static input lists. Dynamic addition of fields may further provide a non-limiting way of stylizing a user interface such that the interface may be kept simple and uncluttered. Logistics management system 4 provides a simple interface for quick and efficient interaction by user 18, yet provides the ability to add complexity seamlessly for more complicated tasks. In this manner, logistics management system 4 provides a powerful user interface 130 that remains uncluttered, and allows user 18 to dynamically insert defined field sets into activity regions as needed based on the complexity and data requirements of the current task. As a result, the user interface may suit all levels of users by allowing for dynamic addition of fields to a static list.

In one embodiment, user interface modules 27 provide functionality by which user 18 may configure, in detail, the user interface to meet the precise needs the user. For example, in addition to the dynamic field set insertion functionality described above, user interface modules 27 allow the user to finely control the data fields associated with each activity region associated with a task. In particular, logistics management system 4 maintains a user profile for user 18 that defines data field preferences, and allows user 18 to configure an array of preferences designed to aid in completing shipment management tasks. For example, the preferences may include defining the user interface detail such that only information user 18 needs is presented and dictating the order in which fields are presented so as to accommodate a preferential task flow.

Figure 12:
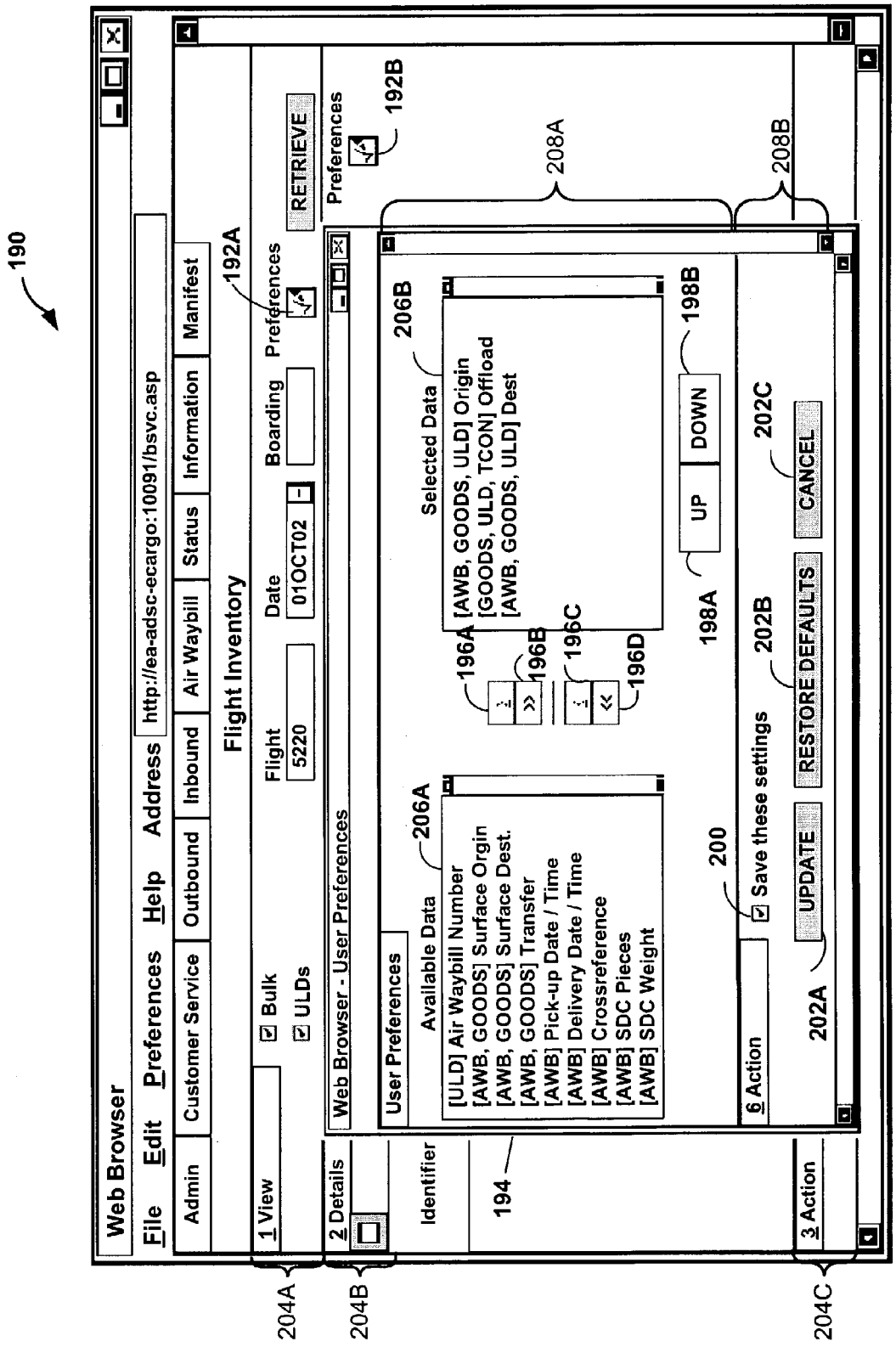
FIG. 12 depicts an example user interface that illustrates the customization features of logistics management system.

FIG. 12 depicts an example user interface 190 that illustrates the customization features of logistics management system 4. In this example, user interface modules 27 display a user interface 190, which represents a task-based user interface that which contains various input regions for carrying out a shipment management task, as described above.

In the illustrated embodiment, item selection region 204A and activity region 204B include respective preference control inputs 192A and 192B, respectively. A preference control input 192 is not required for each region, but may be included in any region where user preference control is desired. As shown, action region 204C does not include a preference control input, but in other user interface modules similar regions may contain a preference control input. Moreover, preference control inputs may be included within "hidden" field sets, as described above. The result of selecting a "hidden" preference control input is to customize "hidden" fields within the region.

In response to user input received via one of preference control inputs 192, user interface modules 27 present preference control window 194. For example, in response to user selection of preference control inputs 192B, user interface modules 27 present preference control window 194, which includes a variety of input and output mechanisms with which user 18 controls the specific data to be provided by input area 204B. As shown, preference control window 194 includes two regions: user preference region 208A, and action region 208B. Both of these regions are consistent with the task-oriented nature of user interface 190.

In the illustrated example, preference control window 194 presents two sets of data types, available data list 206A and selected data list 206B. Available data list 206A may include a list of all possible fields that may be included within activity region 204B of user interface 190. User 18 may customize activity region 204B by selecting one or more items from available data list 206A. Preference control window 194 may detect the selection and highlight the item indicating that it has been selected. User 18 may further select item control input 196A to move the previously selected items into selected data list 206B. Moreover, all of the available items in available data list 206A may be moved to the selected data list 206B by selecting item control input 196B. In this way, individual items may be added to the selected data list, which will configure activity region 204B of user interface 190.

Preference control window 194 further includes item control input 196C to remove selected items from selected data list 206B returning them to available data list 206A. Item control input 196D may be used in the opposite fashion of item control input 196B. Item control input 196D may remove all items from selected data list 206B and return them back to available data list 206A.

Selection of item order inputs 198 by user 18 directs user interface modules 27 to reorder the items in the selected data list. Reorder of the item is done by selecting the item and pressing either item order input 198A ("UP") or item order input 198B ("DOWN"). Specifically, user interface modules 27 move the selected item up or down the list corresponding to which item order input is selected.

Preference control window 194 may offer additional options that allow user 18 to save preferences based on selected data list 206B. In particular, user 18 may select check box input 200 to save the selected data fields for use in other sessions with logistics management system 4. If the check box input is not "checked" ("checked" is displayed as a box with a check mark in it) then the preferences may not be saved, and may not be available for use in other sessions.

Action region 208B allows user 18 to store the preferences via check box input 200, as described, and includes preference action inputs 202A–202C. Preference action input 202A allows user 18 to commit the currently selected data field preferences, and refresh user interface 190 with the selected items in selected data list 206B. In particular, the data fields corresponding to the preference items in selected data list 206B will be appear in activity region 204B of user interface 190 in the same order as they appeared in the list. In addition, action input 202A causes user interface modules 27 to save the data field preferences when user 18 enables check box input 200.

Preference action input 202B causes user interface modules 27 to restore a default selection of preference data fields, and update user interface 190 with the default selection of preference items. Preference action input 202B may further save the default selection of preferences to logistics management system 4.

Finally, preference action input 202C cancels all preference selections, leaving user interface 190 as it was prior to selecting the preference control input 192B.

In one embodiment of the invention, an administrator may control the set of data fields available for selection by user 18, i.e., available data list 206A, based on access rights of the particular user. For example, logistics management system 4 may define a range of access rights for assigned to remote users by the administrator. User interface modules 27 may filter the data fields available to user 18 based on the access rights associated with the user. In this manner, a user with greater access rights may, for example, be allowed to select a broader range of data fields than a user with lesser access rights. Individual lists may further be customized to show different items based on other data describing the user, such as a business unit or function to which the user is assigned. In this way, user 18 may customize regions of user interface 190 with specific data fields that pertains to the tasks performed by the user, thus increasing the ease of use of the customization features.

In one embodiment, logistics management system 4 allows user 18 to configure and save different customized versions of user interface 190. In this manner, user 18 may customize and save the configuration of user interface 190 for use in different situations, e.g., "special cases." For example, user 18 may create and save a "Storm Version" of user interface 190 that includes any additional data fields that may be needed to track and locate cargo shipments when a storm occurs.

Figure 13:
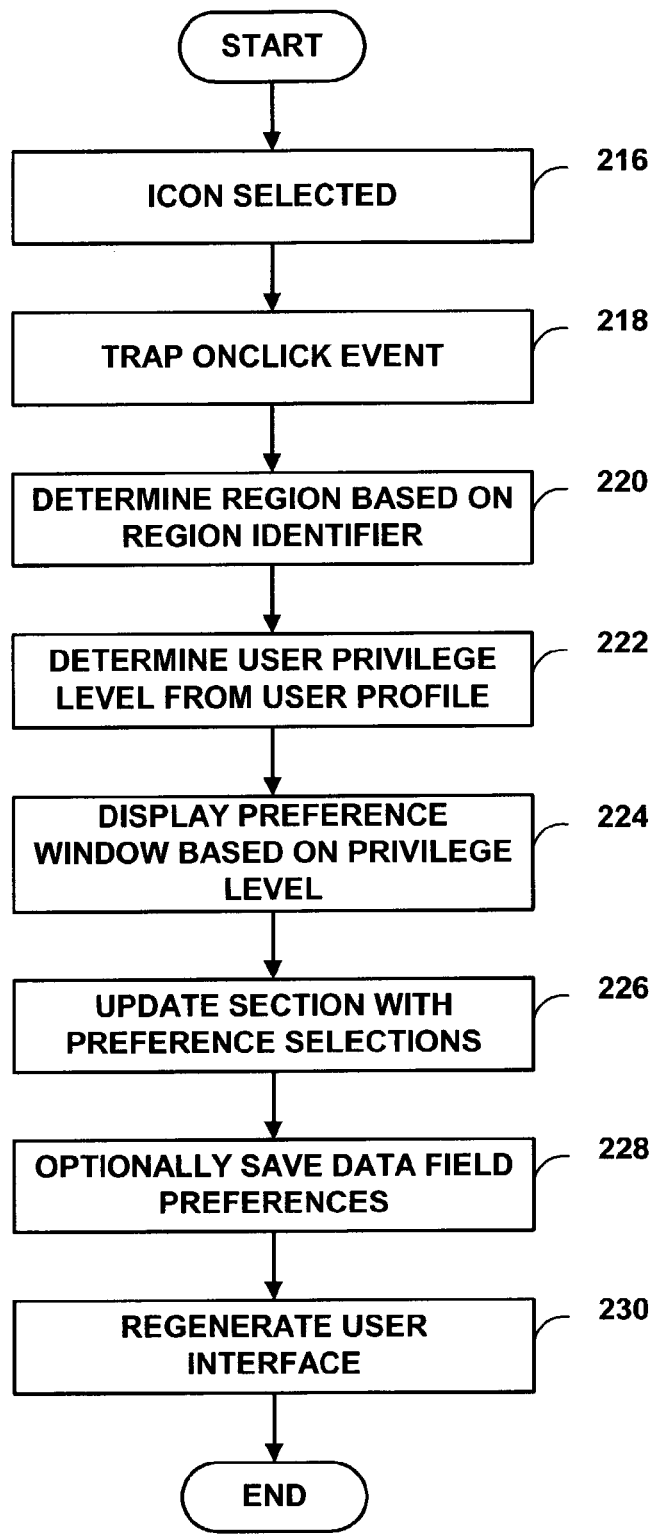
FIG. 13 is a flowchart illustrating exemplary operation of the logic management system in providing user preference customization of an activity region on a task-oriented user interface.

FIG. 13 is a flowchart illustrating exemplary operation of logistics management system 4 in providing user preference customization of an activity region on a task-oriented user interface. Initially, user interface modules 27 may generate a task-based user interface, e.g., user interface 190 (FIG. 12), to include default data field preferences for each activity region, such as activity region 204B. User 18 may customize an activity region, e.g., activity region 204B, by selecting a corresponding preference control input, such as preference control input 192B (216).

Selection of preference control input causes the generation of an event, e.g., an on Click event, within the web browser, as described above. In response, the event handler of the web browser traps the on Click event (218), and invokes one or more user interface modules 27 that are linked to preference control input 192B. For example, a property of an object associated with preference control input 192, as defined in accordance with the DOM (Document Object Model), may link the input to an Application Server Page or other server-side module. The event handler also passes pertinent information, such as a region identifier of preference control input 192B, to the invoked user interface module 27. User interface module 27 uses the region identifier to determine the region, e.g., regions 204 (FIG. 12) associated with the selected preference control input (220).

The invoked user interface module 27 uses the region identifier to control the generation of preference control window 194, e.g., the data fields of available data list 206A, contained within a preference control window such as preference control window 194. In addition, user interface modules 27 may utilize the region identifier to determine formats, data representation, action inputs and the like. User interface modules 27 may control further specification of preference control window 194, including the data fields available for customization, based on the access privileges of user 18, as stored in a user profile by logistics management system 4 (222). In particular, user interface modules 27 operating within web server 24 may request a profile for user 18 by querying database servers 26.

User interface modules 27 operating on web server 26 dynamically generate preference control window 194 based on the user profile, as well as the region identifier and other information received from the web browser, and communicates the preference control window to client computing device 25 for presentment to user 18.

Once displayed, user 18 may interact with any of the various inputs of preference control window 194 to trigger further events for dynamic customization of the data fields (226). In particular, each of the item control inputs 196 (FIG. 12) may generate an on Click event that is handled and linked to client-side user interface modules 27. For example, client-side user interface modules 27B may handle the movement of selected data fields to and from available data list 206A and selected data list 206B.

Movement of the items from available data list 206A to selected data list 206B may be achieved by copying an object node relating to the selected data field in available data list 206A. For example, the "[ULD] Air Waybill Number" object may be defined as a child node of the available data list object. The client-side user interface modules 27B traverse the child nodes of the available data object until the "[ULD] Air Waybill Number" child node is found. The client-side user interface modules 27B then remove the object from the parent object, and copy the object so that it can be added as a child node to an object associated with the selected data object. Finally, the client-side user interface modules 27B associated with the preference order inputs 196 may reorder child nodes within the child node list of the selected data object. This can be done by swap procedures or other techniques.

Finally, user selection of preference action input 202A causes user interface modules 27 to save any selected data field preferences, depending on the state of check box 200 (228). In addition, user interface modules 27 terminate the display of preference control window 194, and refreshes user interface 190 based on the selected preferences (230). Specifically, user interface modules 27 generate a new web page or other user interface for communication client computing device 25 based on the data field preferences, and communicate the new user interface for presentation to user 18.

In response to selection of preference action input 202B, user interface modules 27 direct database server 26 to retrieve the default data field preferences by accessing database server 26 based on a user identifier for user 18, and generating user interface 130 in accordance with the default data field preferences. Selection of preference action input 202C ("Cancel") may terminate the preference selection window 194 without refreshing user interface 190 and without saving any data field preferences.

In this manner, logistics management system 4 provides functionality by which user 18 may configure, in detail, the user interface to increase the efficiency in which the user performs shipment management tasks. As described above, logistics management system 4 allow the user to finely control the data fields associated with each activity region associated with a task. Moreover, logistics management system 4 maintains a user profile for user 18 that defines the data field preferences, and allows user 18 to configure an array of preferences designed to aid in completing shipment management tasks. For example, the preferences may include defining the user interface detail such that only information user 18 needs is presented and dictating the order in which fields are presented so as to accommodate a preferential task flow.

Logistics management system 4 may further provide functionality allowing user 18 (FIG. 2) to easily perform a shipment related task on a plurality of items, e.g., shipments, goods, freight containers, and the like. In particular, user 18 may select a plurality of items within one or more activity regions of a user interface, and then perform an action to the selected items with a single interaction with an action region of that user interface.

In this way, an action may be performed on multiple items related to an overall task with limited user input required, thus achieving increased efficiency. Unlike conventional logistics management systems, the user need not individually select and process each item, possibly requiring interaction with a significant number of different screens.

Figure 14:
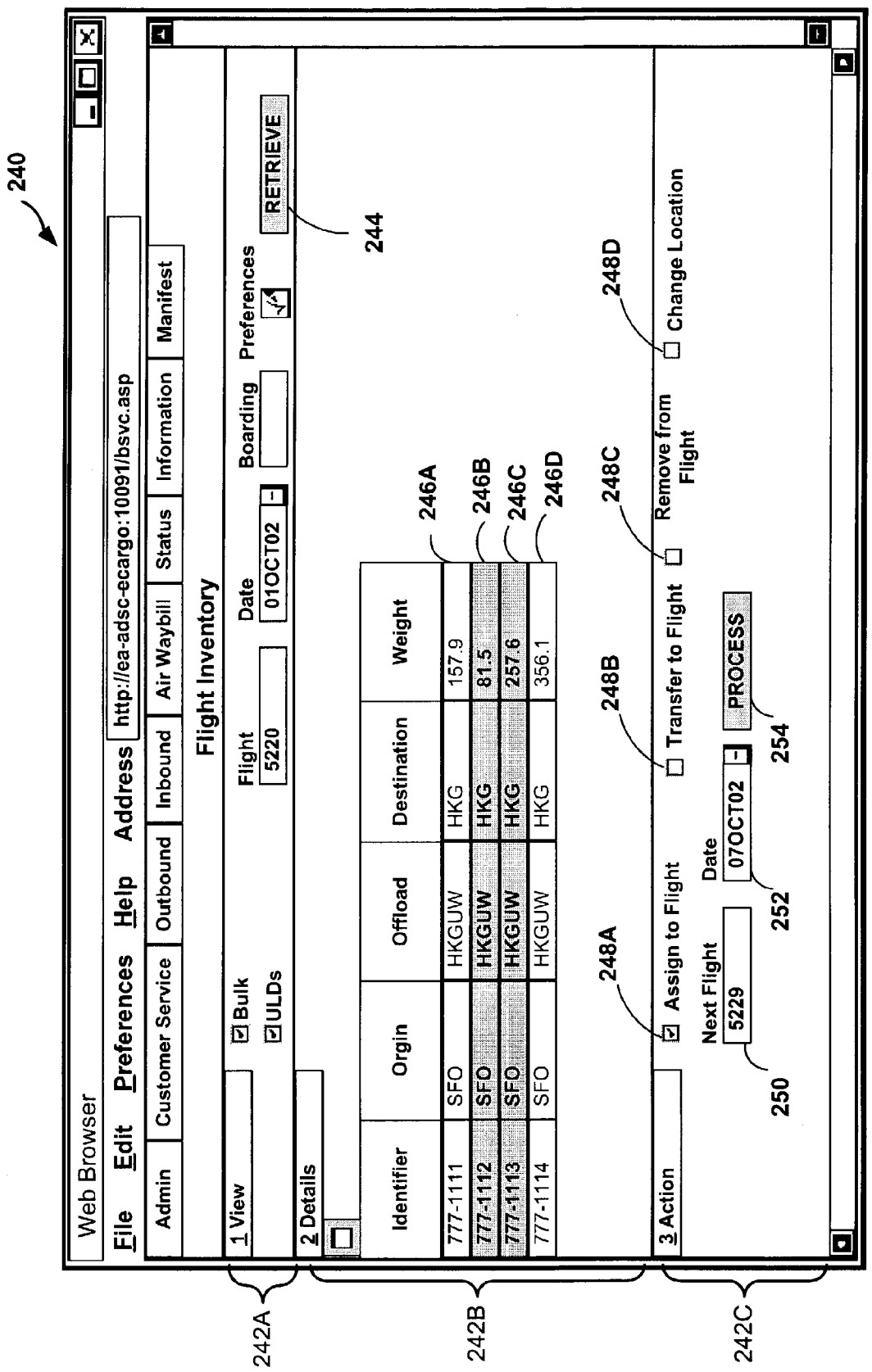
FIG. 14 is a screen illustration of example a user interface that allows the user to perform a logistics management task on a plurality of items.

FIG. 14 is a screen illustration of example user interface 240 that allows user 18 to easily perform a logistics management task on a plurality of items. Specifically, user interface 240 allows user 18 to select multiple items, and an action to be simultaneously performed to the selected multiple items. In this example, user interface 240 comprises three regions to guide user 18 in performing a flight check in task: item selection region 242A, activity region 242B, and action region 242C. User interface 240 may comprise additional regions not shown in FIG. 14. Furthermore, the multiple selection and action functionality may be applied to any task consistent within the scope of the invention, and is not be limited to flight check in.

As described above, user 18 interacts with item selection region 242A to populate activity region 242B. Initially, activity region 242B may not display any items for processing, and may require that user 18 complete item selection region 242A. In this way, a task may be completed stepwise. FIG. 14 shows the result of receiving a selection of view input 244. After receiving the selection, region 242B may have been populated with list items 246A, 246B, 246C and 246D (collectively "list items 246"). In this example, items 246 are presented as a list structure as a means for multiple selection; however, other input structures may be used. For example, a series of check boxes next to a list of item indicators may be used to select multiple items.

User 18 may individually select list items 246 using keystrokes, mouse clicks or the like. The number of list items selected may be any number of items. In this example, list items 246B and 246C are selected. Once selected the selection may be indicated by highlighting the selected item. User 18 may also desire to unselect a list item. This can be done by again selecting the item whereby the selected item will not be highlighted after the selection. Examples of unselected items include list item 246A and list item 246D.

After user 18 has selected list items 246, the user may initiate a task on all of the selected items 246 by selecting on of action control inputs 248A–D of action region 242C. In this example, user 18 has elected to perform the task of assigning items 246 to a particular flight. User 18 may specify which flight to assign the selected items to by entering a flight into text input 250. Selecting the date from drop-down list 252 may also specify the flight date.

In response to selection of action input button 254, user interface modules 27 interact with host computer 22 to perform the selected task on each of the selected items 246B, 246C. In this example, host computer 22 assigns each of items 246B and 246C to flight 5229 on Oct. 7, 2002. In this manner, a common task may be performed on multiple items, e.g., items 246B, 246C, on a single task-oriented user interface 240, and with only needing limited input from user 18.

Additionally, the context of the action may also change depending on the item selected. For instance, list item 246B may have an associated participant that is set up to receive notification when the shipment is assigned to the flight. In this instance, processing this list item may require additional steps to automatically send an email notification to that participant. In this way, the action may be tailored to each of the selected items to which the action was applied.

Figure 15:
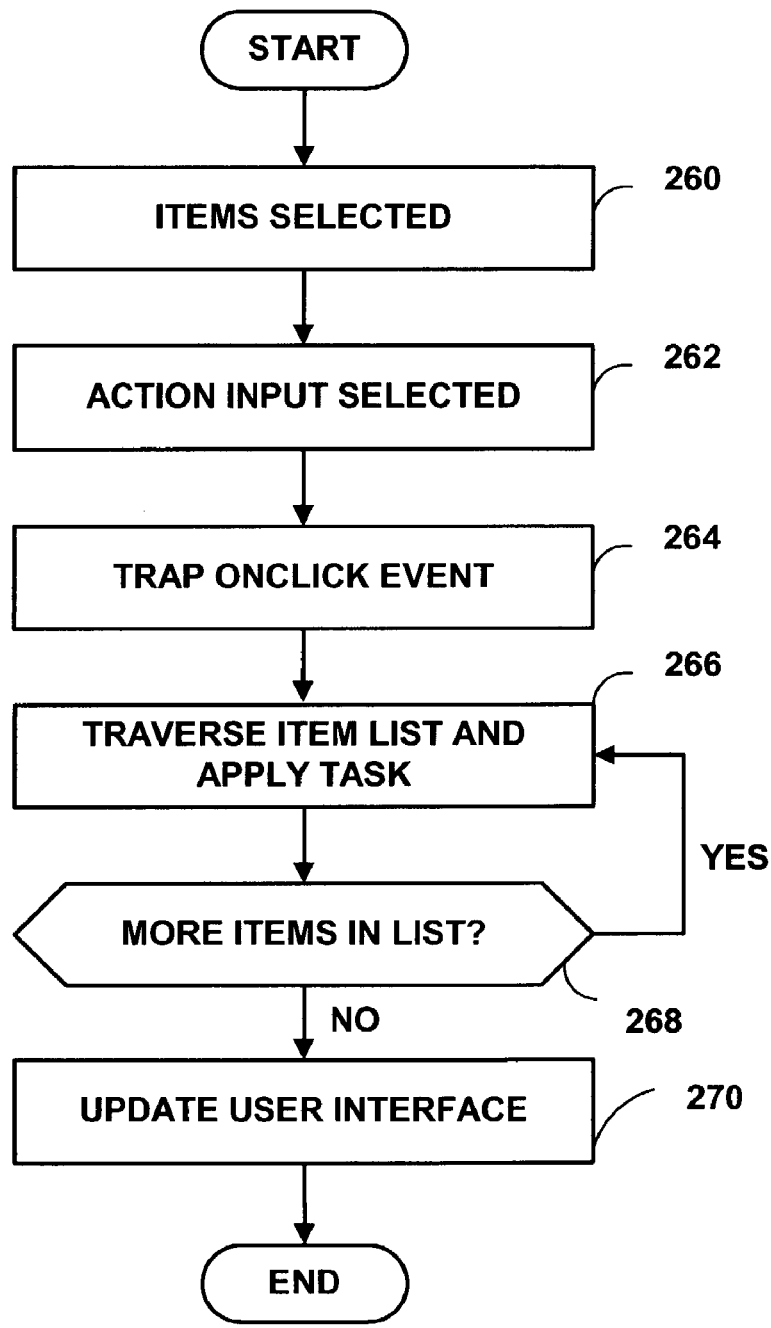
FIG. 15 is a flowchart illustrating exemplary operation of the logistics management system in performing a shipment management task to multiple items with a single user interface screen.

FIG. 15 is a flowchart illustrating operation of exemplary operation logistics management system 4 in simultaneously performing a shipment management task to multiple items with a single user interface screen. Initially, user 18 selects one or more items from an activity region, e.g., activity region 242B, in any order, and using keystrokes, mouse clicks, and the like (260). Each selectable item may be represented as a collection of input objects in accordance with the DOM (Document Object Model), and each object may define a set of properties. For each selected item, user interface 240 may generate the on Click event, as described above, causing the web browser event handler to invokes client-side user interface modules 27B. The invoked client-side user interface modules 27B may then update the properties of the objects related the item to record its selection, and to change the appearance of the objects to indicate their selection. As user 18 selects additional items, the client-side user interface modules 27B continue this process.

When user interface 240 receives the selection of the action input (262), such as action input 254, user interface 240 generates an on Click event and again invokes user interface modules 27.

In response, client-side user interface modules 27B traverse the list of selected objects to generate item selection information (266, 268), and communicate the selection information to logistics management system 4. For example, the selected information may include unique identifiers associated with the selected items, e.g., items 246B, 246C. The identifiers may be passed to logistics management system 4 separately for processing, or as a group.

After all of the items are processed, user interface modules 27 update user interface 240 to reflect any changes as a result of the performed task (270)

In this manner, logistics management system 4 may provide functionality allowing user 18 to easily perform a shipment-related task on a plurality of items, e.g., shipments, goods, freight containers, and the like. Moreover, user 18 may select a plurality of items within one or more activity regions of a user interface, and then perform an action to the selected items with a single interaction with an action region of that user interface. In this way, an action may be performed on multiple items related to an overall task with limited user input required, thus achieving increased efficiency.

Logistics management system 4 and user interface modules 27 may further support task-oriented functionality that allows for user 18 to achieve more efficient data entry. More specifically, user interface modules 27 support an automated, tiered approach to completion of input fields. According to the techniques, user 18 may provide data entry in the form of text-based input, e.g., an acronym for an airport, if known. Alternatively, user 18 may select an item from a subset of available items, which is dynamically maintained based on prior user input. In addition, the user may browse a complete set of available items to populate an input field. In this manner, the tiered approach supports ease of use by individuals having a range of training and expertise.

Figure 16:
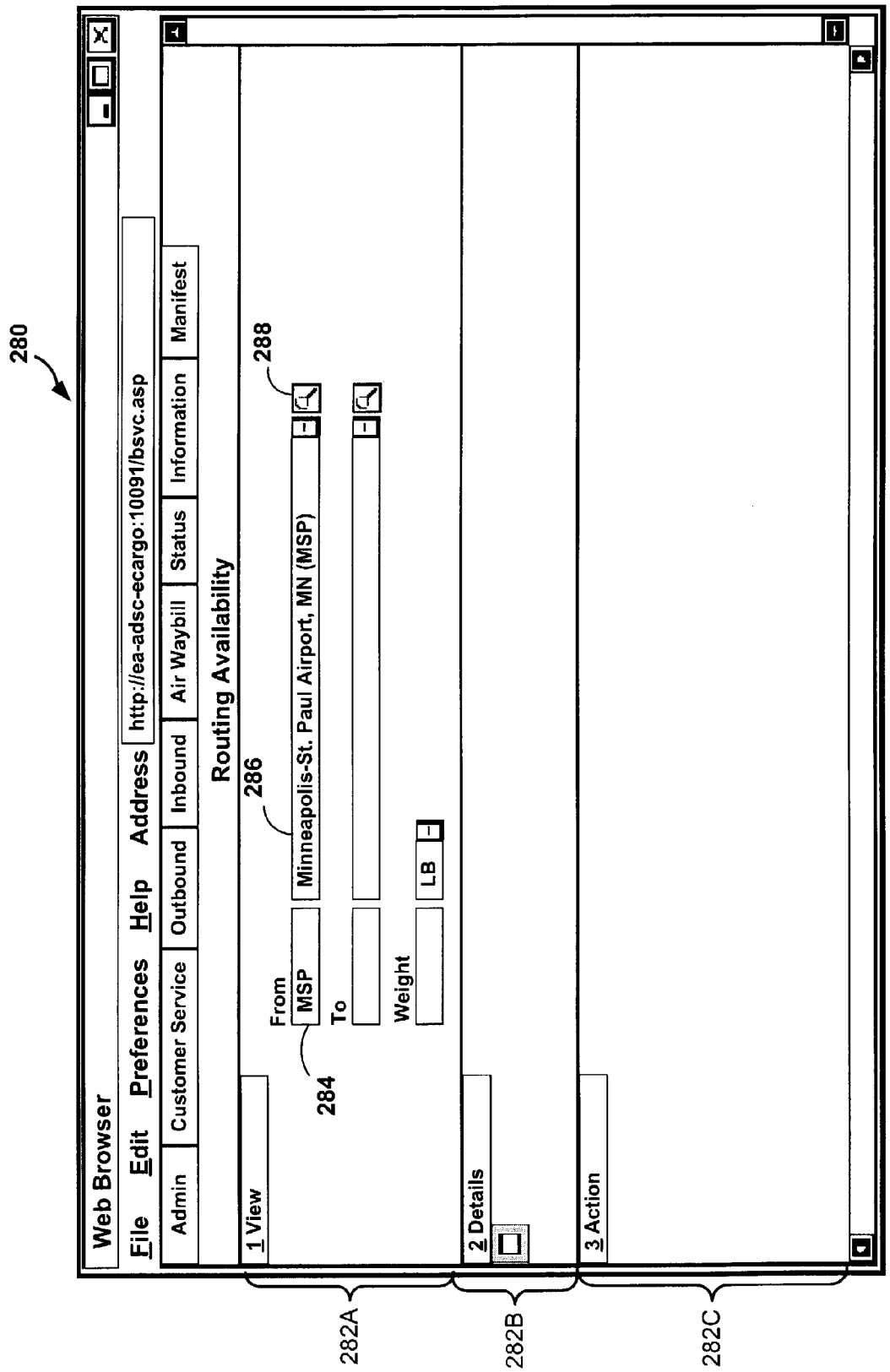
FIGS. 16–19 are screen illustrations of an example user interface presented by the logistics management system that utilizes a tiered approach to facilitate data entry.

FIG. 16 is a screen illustration of example user interface 280 comprising a tiered approach to facilitate data entry. As described above, user interface 280 may comprise a number of task-oriented regions 282A–282C. In this illustrated example, region 282A includes text input field 284, drop-down list 286 and search input 288.

Initially, text input field 282 may not be blank, and the drop-down list 286 may not be populated with an initial set of selectable items, which is a subset of a larger set of selectable items available via search input 288. The subset list may include frequently used items or a history of the last items selected.

In accordance with the tiered approach, user 18 may enter text into text input field 284, select an item from the subset of items presented by drop-down list 286 or select an item from the complete set of items presented in response to search input 288. Moreover, text input field 284 may be associated with drop-down list 286, such that entering text into text input field 284 causes user interface 280 to automatically select an item from drop-down list 286 that is associated with the entered text. For example, as user 18 enters text input "MSP" in text input field 284, as illustrated in the example of FIG. 16, client-side user interface modules 27B automatically select an associated item, i.e., "Minneapolis-St. Paul Airport, MN (MSP)", from the subset of items available within drop-down list 286. In this manner, user interface 280 provides immediate feedback that user 18 has entered a code that is associated with a selectable item, and helps reinforce to the user the correct association between the text inputs and the selectable items.

If user 18 is unaware of the associated input for a desired item, e.g., "MSP," user 18 may skip text input field 284 and select an item from the subset of items maintained by drop-down list 286. For example, user 18 may select "Minneapolis-St. Paul Airport, MN (MSP)" from the subset of items available within drop-down list 286. In response, client-side user interface modules 27B automatically update text input field 284 with the associated text input, e.g., "MSP." In this manner, client-side user interface modules 27B provide immediate feedback user 18 has selected the appropriate item from drop-down list 286, and helps reinforce to the user the correct association between the text inputs and the selectable items.

If the desired item is not available within the current subset of items presented by drop-down list 286, user 18 may select search input 288 to view the complete set of desired items. Upon identifying the desired item, user 18 may select the item from the complete set, causing client-side user interface modules 27B to automatically update both text input field 284 and drop-down list 286. In particular, client-side user interface modules 27B update text input field 284 with the associated text input, e.g., "MSP," and drop-down list 286 with the selected item, e.g., "Minneapolis-St. Paul Airport, MN (MSP)." If the selected item is already present within the subset of items available from drop-down list 286, then client-side user interface modules 27B cause the item to be displayed. If, however, the selected item is not available within the subset, then client-side user interface modules 27B automatically update the subset of items associated with drop-down list 286 to include the newly selected item. In this manner, the newly selected item will be available via drop-down list 286 when subsequently accessed by user 18. Consequently, client-side user interface modules 27B may be viewed as adaptively updating the subset of items based on selections from user 18.

As an additional feature, client-side user interface modules 27B may automatically utilize input of text input field 284 to serve as a narrowing parameter when search input 288 is selected. In this example, the "MSP" input of text input field 284 may be used to narrow the number of items initially displayed by user interface 280 when search input 288 is selected.

Figure 17:
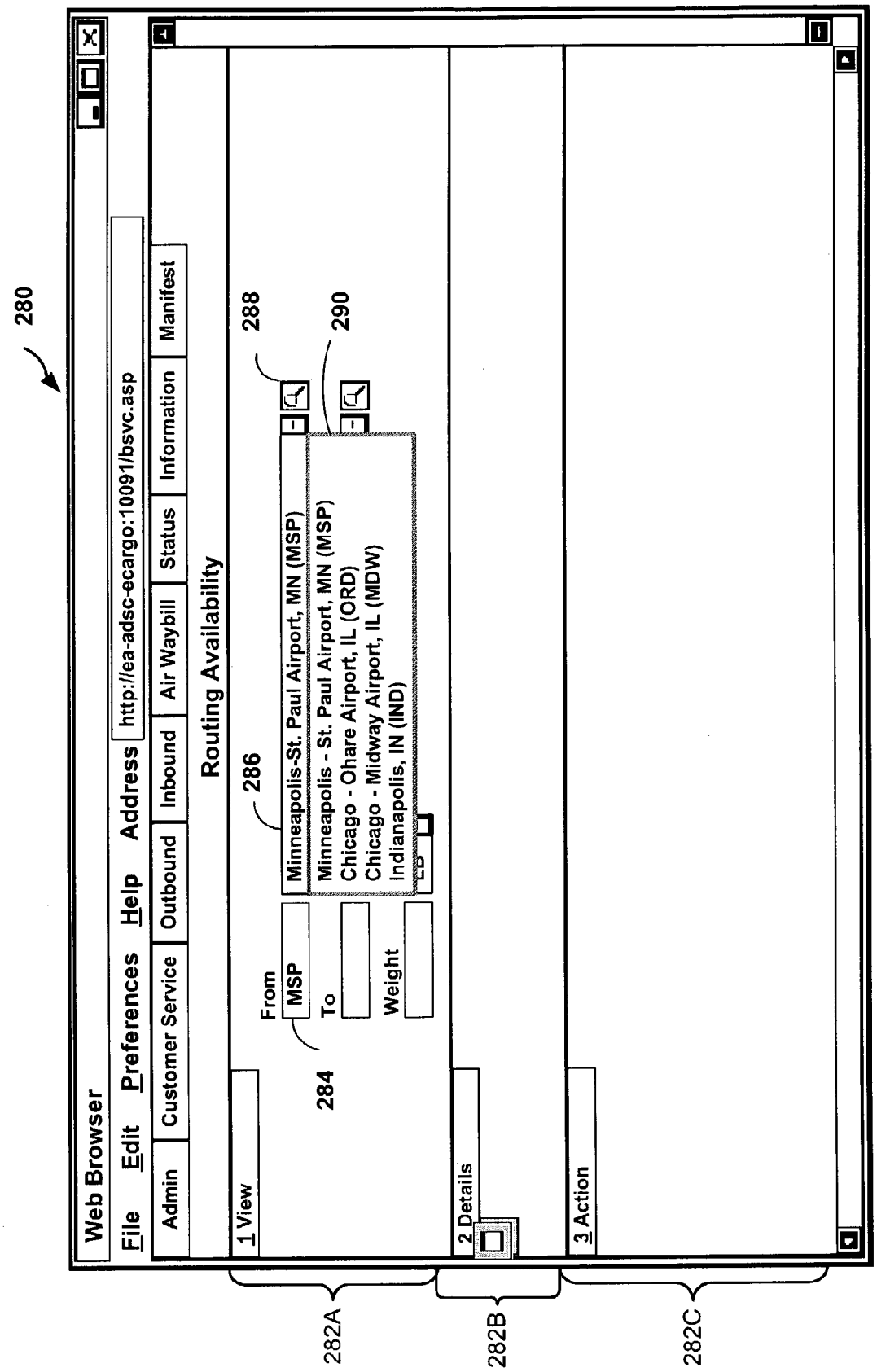

FIG. 17 is a screen illustration of the example user interface 280 of FIG. 16 displaying a subset of selectable items 290 ("subset 290") associated with drop-down list 286. In this example, subset 290 is displayed within the same "window" of user interface 280. Alternatively, client-side user interface modules 27B may display subset 290 as a separate window on top of user interface 280.

In this example, subset 290 provides a list of airports for cargo shipments. User 18 (FIG. 2) may select any of the items within subset list 290. In particular, subset 290 presents four items, which may be a subset of the entire listing of city airports that user interface 280 stored by logistics management system 4. If user interface 280 receives a selection of an item within subset list 290, then client-side user interface modules 27B automatically display the selection in text input field 284, as described above.

Figure 18:
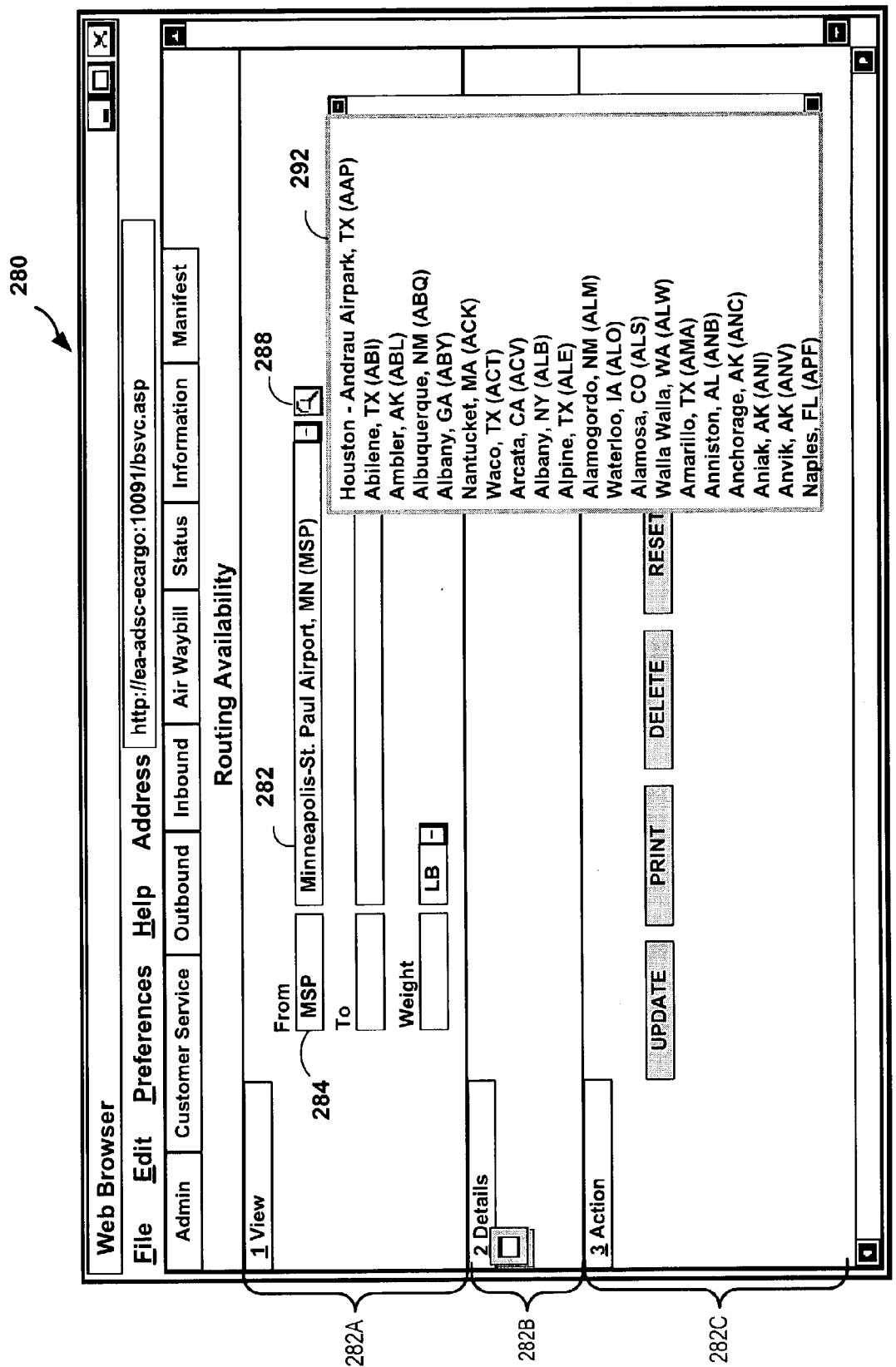

FIG. 18 is a screen illustration in which example user interface 280 of FIG. 16 displays a complete set of selectable items 292 ("set 292"). In this example, set 292 contains a listing of airport codes and their associated city and state. In one embodiment, client-side user interface modules 27B may present a text-based search field (not shown) at the top or otherwise proximate to set 292. User 18 may interact with this search field to provide input by to narrow the number of items presented within set 292.

In the embodiment shown set 292, client-side user interface modules 27B present set 292 as a separate window displayed on top of user interface 280. Alternatively, set 292 may be displayed within the same window as user interface 280, e.g., as a drop-down list.

Figure 19:
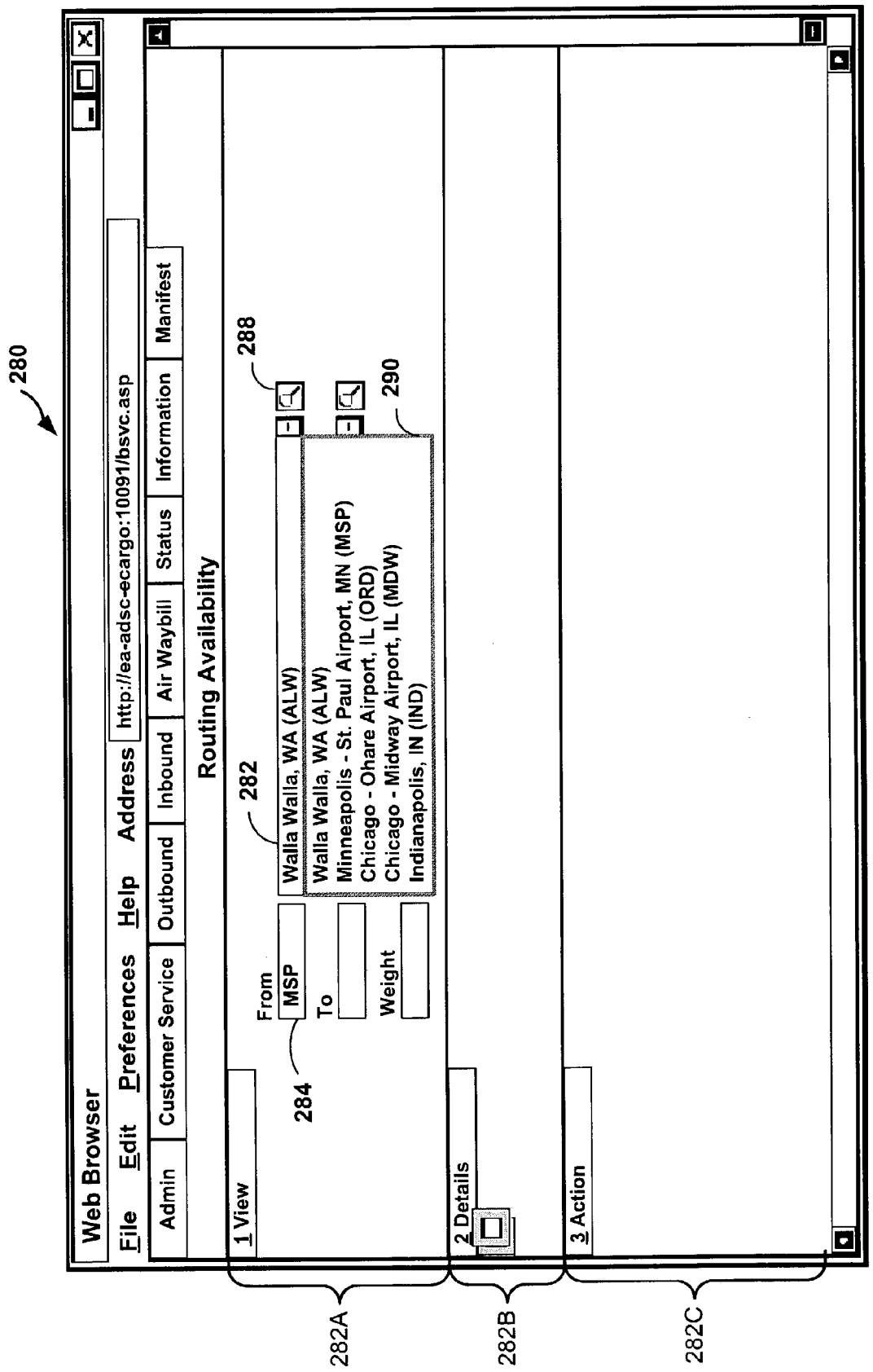

FIG. 19 is a screen illustration of the example user interface 280 of FIG. 16 after user 18 has selected an item from set 292 (FIG. 18). As illustrated, user interface modules 27 have automatically added the item selected from set 292 to the subset 290 associated with drop-down list 286. In particular, this screen illustrates an exemplary addition of the "Walla Walla, WA (ALW)" item to subset list 290 that may be in response to the selection of the "Walla Walla, WA (ALW)" item from set 292 (FIG. 18).

User interface modules 27 may expand subset 290 until a user-configurable number of items is reached. Upon reaching the define limit, user interface modules 27 may employ a least-recently used approach to discard items from subset 90 to make room for the newly selected item.

Figure 20:
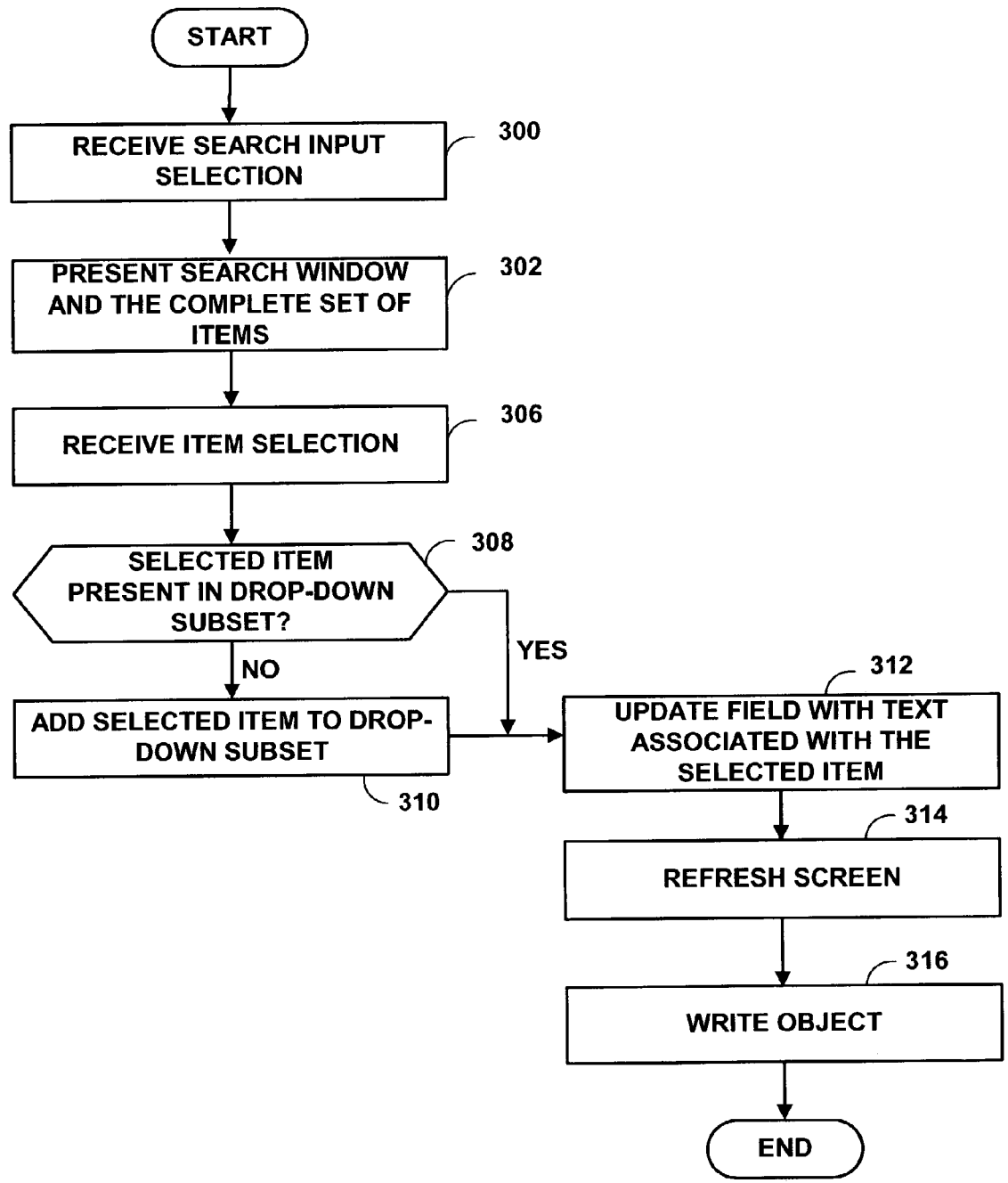
FIG. 20 is a flowchart further illustrating the tiered menu techniques of the logistics management system.

FIG. 20 is a flowchart further illustrating the tiered techniques to capture data entry within a task-oriented user interface, such as user interface 280 (FIG. 16.), of logistics management system 4. In particular, the illustrated flowchart illustrates the process by which user interface modules 27 automatically update subset 290 associated with drop-down list 286 when a user selects an item from complete set 292.

As illustrated, the tiered approach may be implemented using client-side user interface modules 27B. In this embodiment, user interface modules 27 of logistics management system 4 forward the complete set 292 at the same time user interface 280 is communicated to client computing device 25. Alternatively, portions or all of the functionality described below may be implemented as server-side user interface modules 27A.

Initially, user interface 280 receives input from user 18 selecting search input 288. Upon receiving the selection (300), user interface 280 invokes a particular user interface modules 27 linked to present set 292 to user 18 (302).

To generate set 292, the invoked user interface module 27 may initially determine whether user 18 has entered any text within input text field 284 (FIG. 18). If so, user interface modules 27 may include a search field displaying the text, and may narrow the items within set 292 based on the entered text. In particular, user interface modules 27 may query database server 26 to retrieve items based on the supplied text input. Finally, user interface modules 27 generate user interface 280 as a web page or other network interface, and communicate the user interface to client computing device 25 for display to user 18 as a separate search window.

Next, user 18 views the search window and selects one of the items of the displayed set 292 (306). In response, user interface 280 invokes user interface modules 27, which determine the item selected from 292. This may be accomplished using properties associated with set 292 and passed to the invoked user interface modules 27.

Once user 18 selects an item from set 292 from the search window, client-side user interface modules 27B attempt to populate text input field 284 and subset 290 from user interface 280. Specifically, the invoked client-side user interface module 27B examines subset 290 to determine whether the subset contains the selected item selected (308). The client-side user interface modules 27B may traverse a container of DOM objects associated with subset 290 to determine whether any of the objects within the container relates to the selected item. In this example, the client-side interface modules 27B determine whether an object in the container exists representing "Walla Walla, WA (ALW)."

If the selected item is not currently within set 290 associated with drop-down list 286, the client-side user interface modules 27B dynamically add the selected item to the subset (310), as illustrated in FIGS. 17, 19. Specifically, client-side user interface modules 27B may dynamically update the container of DOM objects associated with sets 292 to include an object for the selected item. The new object may have properties, which also may be set to conform to particular container settings.

Finally, the client-side user interface modules 27B refresh user interface 280 (314), as described above. Additionally, the client-side user interface modules 27B may temporarily store the current configuration of set 290, or may permanently store the configuration as user preferences on logistics management system 4 (316).

In this manner, logistics management system 4 and user interface modules 27 support an automated, tiered approach for data entry. As described, user 18 may provide data entry in the form of text-based input if known. Alternatively, user 18 may select an item from a subset of available items, which is dynamically maintained based on prior user input. In addition, the user may browse a complete set of available items to populate an input field. In this manner, the tiered approach supports ease of use by individuals having a range of training and expertise.

Various implementations and embodiments of the invention have been described. Nevertheless, it is understood that various modifications can be made without departing from the invention. Accordingly, these and other embodiments are within the scope of the following claims.

The invention claimed is:

1. A system comprising:
a host computer operating software that performs logistics management tasks for shipment items; and
a user interface module that presents a user interface for access to the host computer, wherein the user interface includes a single window having an item selection region to receive shipment criteria for specifying one or more items, one or more activity regions to receive activity data for performing a plurality of activities associated with items that match the shipment criteria, and an action input region to receive action input specifying one or more of the logistics management tasks, wherein the activities specified by the activity data are required for completion of the one or more logistics management tasks specified by the action input,
wherein the host computing system automatically performs the specified one or more logistics management tasks on a plurality of the items in response to the action input.

2. The system of claim 1, wherein the host computer maintains shipment data associating the items with at least one of respective origins, destinations, shipment dates, and participants, and wherein host computing system automatically adjusts the shipment data for each of the selected items in response to the action input.

3. The system of claim 1, wherein the user interface module presents the items for individual selection by the user, and the host computing system automatically performs the specified logistics management task on the selected items.

4. The system of claim 1, wherein the host computer processes the plurality of items and automatically applies any additional processing required for each of the items to perform the logistics management task.

5. The system of claim 1, wherein the user interface module maintains each of the selectable items as a collection of input objects in accordance with a document object model.

6. The system of claim 5, wherein the user interface module comprises a client-side user interface module executing on a client computing device of the remote user.

7. The system of claim 5, wherein in response to the action input the user interface module traverses the objects associated with the selected items and generates item selection information for communication to the host computer.

8. The system of claim 1, wherein the user interface module presents color-coded headers of a first color within the item selection region and the action region, and presents color-coded headers of a second color within the activity regions.

9. The system of claim 1, wherein the user interface module hierarchically arranges the item selection region, the activity regions, and the action input region based on an order in which the remote user must complete the activities.

10. A method comprising:
presenting a user interface for a host computer that provides logistics management tasks for shipment items, wherein the user interface includes a single window having an item selection region to receive shipment criteria for specifying one or more items from a remote user, one or more activity regions to receive activity data for performing a plurality of activities associated with items that match the shipment criteria, and an action input region to receive action input specifying one or more of the logistics management tasks, wherein the activities specified by the activity data are required for completion of the one or more logistics management tasks specified by the action input; and
processing the action input received from the user to automatically perform the specified logistics management task on a plurality of the items.

11. The method of claim 10, Anther comprising maintaining shipment data associating the items with at least one of respective origins, destinations, shipment dates, and participants, and wherein processing the action input comprises automatically adjusting the shipment data for each of the selected items.

12. The method of claim 10, further comprising presenting the items within the activity regions for individual selection by the user, and wherein processing the action input comprises automatically processing the specified logistics management task on the selected items.

13. The method of claim 10, where processing the action input comprises processing the action input to automatically apply any additional processing required for each of the items to perform the logistics management task.

14. The method of claim 10, further comprising:
maintaining each of the selectable items as a collection of objects in accordance with a document object model;
evaluating the objects associated with the selected items in response to the action input to generate item selection information; and
communicating the item selection information and the action input to the host computer for processing.

15. A system comprising:
computing means for providing logistics management tasks for shipment items;
network interface means for generating a user interface for the computing means; and
a display means for presenting the user interface to a user, wherein the network interface means generates the user interface to include a single screen having an item selection region to receive shipment criteria for specifying one or more items, one or more activity regions to receive activity data for performing a plurality of activities associated with items that match the shipment criteria, and an action input region to receive action input specifying one or more of the logistics management tasks, wherein the activities specified by the activity data are required for completion of the one or more logistics management tasks specified by the action input, and wherein the computing means automatically performs the specified logistics management task on a plurality of the items in response to the action input received from the user.

16. The system of claim 15, wherein the computing means includes associating means for maintaining shipment data that associates the items with at least one of respective origins, destinations, shipment dates, and participants, and wherein the computing means includes adjusting means for automatically adjusting the shipment data for each of the selected items in response to the action input.

17. The system of claim 15, wherein the network interface means includes generating means for generating the user interface to present the items for individual selection by the user, and the computing means includes task management means for automatically performing the specified logistics management task on the selected items.

18. The system of claim 15, wherein the computing means includes data means for maintaining shipment data that associates the items with at least one of respective origins, destinations, shipment dates, and participants, and wherein the computing means includes shipment data means for automatically adjusting the shipment data for each of the selected items in response to the action input.

19. The system of claim 15, wherein the network interface means includes user interface generating means for generating the user interface to define a collection of input objects for each of the items in accordance with a document object model.

* * * * *

UNITED STATES PATENT AND TRADEMARK OFFICE
CERTIFICATE OF CORRECTION

PATENT NO. : 7,194,695 B1  Page 1 of 1
APPLICATION NO. : 10/403588
DATED : March 20, 2007
INVENTOR(S) : Sandra J. Racine et al.

It is certified that error appears in the above-identified patent and that said Letters Patent is hereby corrected as shown below:

On column 15, line 17, "on Change" should read --onChange--

On column 15, line 23, "on Change" should read --onChange--

On column 18, line 57, "on Click" should read --onClick--

On column 18, line 59, "on Click" should read --onClick--

On column 19, line 29, "on Click" should read --onClick--

On column 21, line 36, "on Click" should read --onClick--

On column 21, line 46, "on Click" should read --onClick--

Signed and Sealed this

Seventeenth Day of June, 2008

JON W. DUDAS
*Director of the United States Patent and Trademark Office*